US012704185B1

(12) United States Patent
Daniels

(10) Patent No.: US 12,704,185 B1
(45) Date of Patent: Aug. 11, 2026

(54) METAL OBTURATORS, DILATING DISK VALVES INCLUDING SAME, AND METHODS RELATING THERETO

(71) Applicant: Clarke Industrial Engineering, Inc., North Kingstown, RI (US)

(72) Inventor: Kyle P. Daniels, North Kingstown, RI (US)

(73) Assignee: Clarke Industrial Engineering, Inc., North Kingstown, RI (US)

( * ) Notice: Subject to any disclaimer, the term of this patent is extended or adjusted under 35 U.S.C. 154(b) by 0 days.

(21) Appl. No.: 19/348,489

(22) Filed: Oct. 2, 2025

(51) Int. Cl.
*F16K 3/03* (2006.01)
*F16K 3/04* (2006.01)

(52) U.S. Cl.
CPC . *F16K 3/03* (2013.01); *F16K 3/04* (2013.01)

(58) Field of Classification Search
CPC .................................... F16K 3/03; F16K 3/04
USPC ................................................ 251/212, 304
See application file for complete search history.

(56) References Cited

U.S. PATENT DOCUMENTS 2,307,273 A * 1/1943 Hughes .................... F16K 3/03 251/118
2,649,272 A * 8/1953 Barbato .................... F16K 3/03 138/45
2,839,267 A * 6/1958 Sieradzki .................. F16K 3/03 251/212
3,787,022 A * 1/1974 Wilcox ..................... F16K 3/03 251/212
3,847,389 A 11/1974 Rogers
6,666,237 B2 * 12/2003 De Antoni Migliorati .................. B65B 39/005 141/286
7,819,728 B2 * 10/2010 Beckley ................. B60N 3/106 220/822
8,196,610 B2 * 6/2012 Murakami ......... H05K 7/20272 138/45
8,430,140 B2 * 4/2013 Ognjanovski ...... B60K 15/0406 251/212
8,910,920 B1 * 12/2014 Daniels ..................... F16K 3/18 251/212
8,978,751 B2 * 3/2015 Castriotta ............ E21B 33/062 166/85.4
9,206,911 B1 * 12/2015 Daniels ..................... F16K 3/03
10,508,743 B2 * 12/2019 Wakayama ............. F16K 3/029
2005/0119695 A1 * 6/2005 Carley ............... A61B 17/0057 606/213
2006/0264983 A1 * 11/2006 Holsten ................ A61F 5/0079 606/153

(Continued)

*Primary Examiner* — Minh Q Le

(74) *Attorney, Agent, or Firm* — Bradley Arant Boult Cummings LLP; Daniel E. Sineway, Esq.

(57) ABSTRACT

The disclosed technology relates to systems and methods for managing the flow of a substance through a tubing system. The system can include a dilating disk valve comprising obturator elements and a sealing ring. Each obturator element can have a top side having a substantially convex curvature, a bottom side having a substantially concave curvature, and a lateral side. The lateral side can include an outer side wall and a recessed portion comprising an inner side wall that is recessed inwardly relative the outer side wall. The sealing ring can include a ring body and a sealing material. The recessed portion of each of the plurality of obturator elements can be configured to contact the sealing ring when the dilating disk valve transitions from an open state to a closed state.

20 Claims, 14 Drawing Sheets

(56) References Cited

U.S. PATENT DOCUMENTS

| | | | | |
|---|---|---|---|---|
| 2007/0282352 | A1* | 12/2007 | Carley | A61B 17/068 606/142 |
| 2009/0095350 | A1* | 4/2009 | Bauman | F16K 3/03 251/231 |
| 2015/0041695 | A1* | 2/2015 | Daniels | F16K 3/03 251/212 |
| 2015/0060713 | A1* | 3/2015 | Luebbers | F16K 31/535 251/212 |
| 2015/0337968 | A1 | 11/2015 | Strand | |
| 2022/0316603 | A1* | 10/2022 | Daniels | F16K 3/029 |
| 2024/0295677 | A1* | 9/2024 | Viehbacher | G02B 5/005 |
| 2025/0320922 | A1* | 10/2025 | Lee | F24F 13/1426 |

* cited by examiner 100
700

100
200
700

METAL OBTURATORS, DILATING DISK VALVES INCLUDING SAME, AND METHODS RELATING THERETO

BACKGROUND

In fluid control systems, valves are a vital component for facilitating the amount of fluid flowing through a particular passageway. Commonly, valves include a closing mechanism to block an aperture through which fluid moves. The closing mechanism can include one or more obstructions, such as an obturator element, that moves into the path of the fluid flow to block fluid movement through the aperture. In this way, the obturator element combined with mechanical components of a valve are used to control fluid movement through passageways. Often, these obturator elements are created from a piece of metal with a sealing surface that includes a sealing material, such as elastomer, PTFE, or other material, as non-limiting examples. However, such materials have corresponding certain limitations. In particular, when corrosive, high velocity, or high temperature fluids pass over the petals during opening and closing, parts of the petals—and the sealing material(s), in particular—may erode or melt away.

Commonly, when the sealing material of a valve assembly becomes worn, degraded, or missing, sealing performance can decrease. To repair or replace worn, degraded, missing, or other parts, the entire valve assembly must typically be removed. Thus, the repair/replacement process can be cumbersome and time-consuming. Further, the downtime for the corresponding fluid transportation system can be costly.

Therefore, there is a long-felt but unresolved need for an apparatus, system, or method that can provide an adequate seal while maintaining structural integrity and/or while providing a lengthened working life, particularly in high temperature, extreme low temperature, and/or high velocity applications.

SUMMARY

Briefly described, the disclosed technology generally relates to apparatuses, systems, and methods for fabricating and using metal obturator elements in industrial flow control valves. As will be described more fully herein, the obturator elements can comprise metal that defines a sealing surface without a separate sealing material. Alternatively or in addition, the obturator elements can consist of one or more metals, which can define the sealing surface, among other aspects of the obturator elements.

The disclosed technology includes an obturator element comprising a top side, a bottom side, and a first side. The top side can have a substantially convex curvature. The bottom side can have a substantially concave curvature. The first side can comprise a first outer side wall and a first recessed portion. The first outer side wall can comprise a control aperture and a hinge aperture. The first recessed portion can comprise a first inner side wall that is recessed inwardly relative the first outer side wall. The obturator element can comprise a second side, and the second side can comprise a second outer side wall and a second recessed portion. The second outer side wall can comprise the hinge aperture. The second recessed portion can comprise a second inner side wall that is recessed inwardly relative the second outer side wall. The top side and the bottom side can have a surface roughness that is sufficiently smooth to create a seal between the separate obturator elements when they are in the closed position. For example, the top side and the bottom side can have a surface roughness less than approximately 60 micro-inch roughness average (Ra).

The top side and the bottom side can have a surface roughness between approximately 15 micro-inch Ra and less than approximately 60 micro-inch roughness average (Ra). Alternatively or in addition, the top side and the bottom side can have a surface roughness less than approximately 30 micro-inch roughness average Ra. Alternatively or in addition, the top side and the bottom side can have a surface roughness between approximately 12 micro-inch Ra and less than approximately 30 micro-inch roughness average Ra. Alternatively or in addition, the top side and the bottom side can have a surface roughness between approximately 4 micro-inch Ra and less than approximately 12 micro-inch roughness average Ra. Alternatively or in addition, the top side and the bottom side can have a largest surface imperfection of less than approximately 8 microns, the largest surface imperfection corresponding to a maximum microscopic peak or valley.

The disclosed technology includes a dilating disk valve comprising a body, a gear mechanism, and a plurality of obturator elements. The body can comprise an aperture. The gear mechanism can comprise a rotating ring. The plurality of obturator elements can be in mechanical communication with the rotating ring, and each of the plurality of obturator elements can comprise a top side, a bottom side, and a lateral side (e.g., a first side). The top side can have a substantially convex curvature. The bottom side can have a substantially concave curvature. The lateral side can comprise an outer side wall and a recessed portion. The outer side wall can comprise a control aperture and a hinge aperture. The recessed portion can comprise an inner side wall that is recessed inwardly relative the outer side wall. The top side and the bottom side can have a surface roughness less than approximately 60 micro-inch roughness average (Ra).

The top side and the bottom side each of the plurality of obturator elements can have a surface roughness between approximately 15 micro-inch Ra and less than approximately 60 micro-inch roughness average (Ra). Alternatively or in addition, the top side and the bottom side each of the plurality of obturator elements can have a surface roughness less than approximately 30 micro-inch roughness average Ra. Alternatively or in addition, the top side and the bottom side each of the plurality of obturator elements can have a surface roughness between approximately 12 micro-inch Ra and less than approximately 30 micro-inch roughness average Ra. Alternatively or in addition, the top side and the bottom side each of the plurality of obturator elements can have a surface roughness between approximately 4 micro-inch Ra and less than approximately 12 micro-inch roughness average Ra. Alternatively or in addition, the top side and the bottom side each of the plurality of obturator elements can have a largest surface imperfection of less than approximately 8 microns, the largest surface imperfection corresponding to a maximum microscopic peak or valley.

The dilating disk valve can comprise a sealing ring, and the sealing ring can be approximately axially aligned with the aperture. The recessed portion of each of the plurality of obturator elements can be configured to abut the sealing ring when the dilating disk valve transitions from an open state to a closed state.

The sealing ring can comprise a ring body and a sealing material. The ring body can have an approximately C-shaped cross-sectional shape, and the sealing material can be configured to insert at least partially into the ring body.

The ring body can comprise an inner wall having an inner wall thickness and an outer wall having an outer wall thickness. The inner wall thickness can be greater than the outer wall thickness.

A ratio of the outer wall thickness to the inner wall thickness can be approximately 0.5 or less. Alternatively or in addition, a ratio of the outer wall thickness to the inner wall thickness can be approximately 0.35 or less. The outer wall thickness can be approximately 0.007 inch, and the inner wall thickness can be approximately 0.020 inch.

The sealing material can comprise any suitable material that is resistance to the temperature or chemical composition of the fluid in the pipe. For example, the sealing material can comprise graphite or polytetrafluoroethylene (PTFE).

The disclosed technology includes a method for manufacturing an obturator element. The method can comprise forming (e.g., cutting) an obturator element from a single piece of metal to form an obturator element such that the obturator element comprises a top side, a bottom side, and a first side. The obturator element can have a generally petal-like shape. The top side can have a substantially convex curvature. The bottom side can have a substantially concave curvature. The first side can comprise a first outer side wall and a first recessed portion. The first outer side wall can comprise a control aperture and a hinge aperture. The first recessed portion can comprise a first inner side wall that is recessed inwardly relative the first outer side wall. The obturator element can comprise a second side, and the second side can comprise a second outer side wall and a second recessed portion. The second outer side wall can comprise the hinge aperture. The second recessed portion can comprise a second inner side wall that is recessed inwardly relative the second outer side wall.

Forming the obturator element can comprise cutting the single piece of metal to have a generally petal-like shape using wire electrical discharge machining (EDM) techniques to form the top side and the bottom side, such that each of the top side and the bottom side have a largest surface imperfection of less than approximately 8 microns. The largest surface imperfection can correspond to a maximum microscopic peak or valley.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein.

DETAILED DESCRIPTION

Figures 1A, 1B:
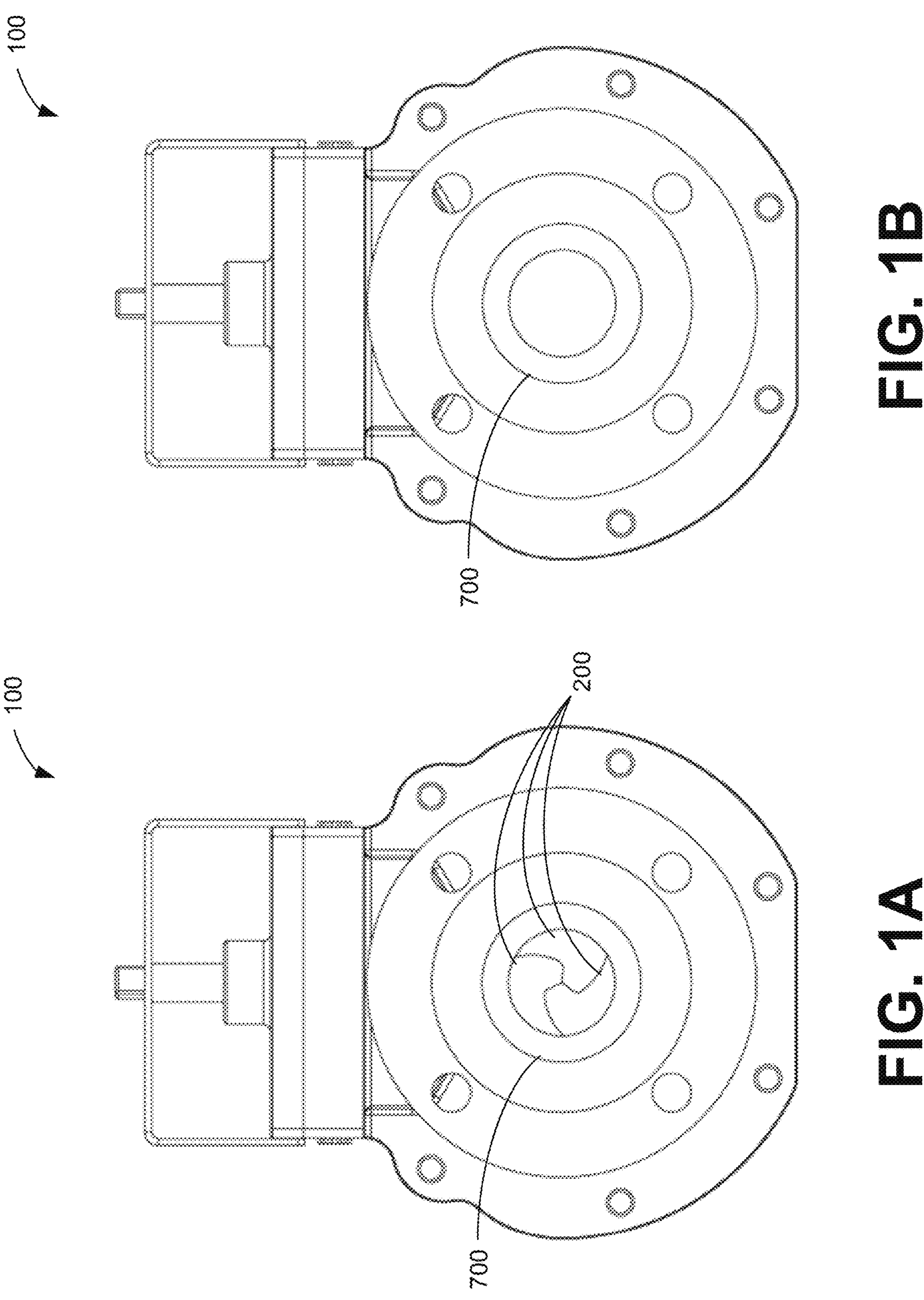
FIGS. 1A and 1B illustrate a front view of an example dilating disk valve assembly in a closed state and an open state, respectively, in accordance with the disclosed technology.

Although certain examples of the disclosed technology are explained in detail herein, it is to be understood that other examples, embodiments, and implementations of the disclosed technology are contemplated. Accordingly, it is not intended that the disclosed technology is limited in its scope to the details of construction and arrangement of components expressly set forth in the following description or illustrated in the drawings. The disclosed technology can be implemented in a variety of examples and can be practiced or carried out in various ways.

Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

It should also be noted that, as used in the specification and the appended claims, the singular forms “a,” “an,” and “the” include plural references unless the context clearly dictates otherwise. References to a composition containing "a" constituent is intended to include other constituents in addition to the one named.

Ranges may be expressed herein as from "about" or "approximately" or "substantially" one particular value and/or to "about" or "approximately" or "substantially" another particular value. When such a range is expressed, the various examples of the disclosed technology includes from the one particular value and/or to the other particular value. Further, ranges described as being between a first value and a second value are inclusive of the first and second values. Likewise, ranges described as being from a first value and to a second value are inclusive of the first and second values.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" can be used herein to connote different aspects of methods employed, the term should not be interpreted as implying any particular order among or between various steps herein disclosed unless and except when the order of individual steps is explicitly required. Further, the disclosed technology does not necessarily require all steps included in the example methods and processes described herein. That is, the disclosed technology includes methods that omit one or more steps expressly discussed with respect to the examples provided herein.

Further, the disclosed technology contemplates performance of various method steps and operations in whole, in part, or in combination by a user and/or a computing device or system. For example, the disclosed technology can include a computing device comprising one or more processors and memory having instructions stored thereon that, when executed by the one or more processors, causes the computing device to perform one or more steps or operations, such as one, some, or all of the method steps discussed herein (expressly or impliedly). Alternatively or in addition, the disclosed technology can include input from, or performance by, a user for performance of one, some, or all of the method steps discussed herein (expressly or impliedly).

Also, in describing the examples, terminology will be resorted to for the sake of clarity. It is intended that each term contemplates its broadest meaning as understood by those skilled in the art and includes all technical equivalents, which can operate in a similar manner to accomplish a similar purpose.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, for example, similar components that are developed after development of the presently disclosed subject matter.

For the purpose of promoting an understanding of the principles of the present disclosure, reference will now be made to the embodiments illustrated in the drawings and specific language will be used to describe the same. Nevertheless, it will be understood that no limitation of the scope of the disclosure is thereby intended; any alterations and further modifications of the described or illustrated examples or embodiments, and any further applications of the principles of the disclosure as illustrated therein are contemplated as would normally occur to one skilled in the art to which the disclosure relates. All limitations of scope should be determined in accordance with and as expressed in the claims.

Overview

Aspects of the present disclosure generally relate to systems and methods for flow management of a substance or material (e.g., a fluid) through a particular passageway. The disclosed technology includes an obturator element made from a single metal piece. The obturator element can have a top surface and bottom surface, which can be configured to mate together between adjacent obturator elements (i.e., the obturator element and another, adjacent obturator element). As a non-limiting example, the top surface and the bottom surface can be manufactured via electrical discharge machining (EDM) techniques (e.g., wire EDM techniques), which can provide surfaces having an extremely low amount of surface roughness. As such, joining of the top surface of a first obturator element and the bottom surface of a second obturator element can provide a tight seal therebetween. As such, the obturator elements can provide sufficient sealing capabilities without the need for interlocking systems (e.g., tongue and groove systems) or the like. Moreover, previous systems include obturators having a coating thereon, which due at least in part to the repeated movement of the obturators, can degrade the coating, thereby decreasing the sealability of the valve system. By providing obturator elements having sufficiently low surface roughness, as described herein, the previous need for coatings or other sealing materials installed on or in the obturators can be rendered moot.

The obturator element can include a hinge aperture. The obturator element can be coupled to a frame at the hinge aperture and can pivot about the hinge aperture. The obturator element can include a control aperture. The obturator element can be affixed to a control mechanism at or via the control aperture. The control mechanism can move the obturator element between a first position and a second position via the control aperture. The first position can be an open position that freely allows fluid flow through a fluid aperture. The second position can be a closed position that prevents fluid from flying through the fluid aperture. The obturator element can be connected to a gear mechanism via the control aperture, and the obturator element can connect to a hinge pin at or via the hinge aperture. The gear mechanism can rotate the obturator element about the hinge pin into an opened or closed state. In an at least two obturator element system, the obturator elements can perform the closing procedure to facilitate sealing the valve. As will be appreciated, sealing the valve can decrease and/or stop the flow of substances through the particular passageway.

The valve can include at least two obturator elements. The valve can include a rotating mechanism (e.g., a gear mechanism) that operatively opens or closes the obturator elements. The valve can include three obturator elements, for example, where each obturator element forms one-third of the closed valve surface. Regardless, the valve can connect to a passageway system to control the flow of a particular substance or material. For example, the valve can be connected between two portions of a pipe to control the flow of fluid.

Example Embodiments

Referring now to the figures, FIGS. 1A and 1B illustrate a front view of an example dilating disk valve assembly 100 in a closed configuration and an open configuration, respectively. As can be seen in FIG. 1A, the dilating disk valve assembly 100 can include two or more obturators or obturator elements 200. An obturator element 200 (sometimes called a "valve petal") can be a device and/or component that manages the flow of a substance through a passageway or aperture. The obturator elements 200 can be rotated, shifted, or otherwise moved into contact with one or more adjacent obturator elements 200 to transition the dilating disk valve assembly 100 into the closed configuration, such as the example closed configuration shown in FIG. 1A. Similarly, the obturator elements 200 can be rotated, shifted, or otherwise moved out of contact with the one or more adjacent obturator elements 200 to transition the dilating disk valve assembly 100 into an open configuration, such as the fully open configuration illustrated in FIG. 1B. In the fully open configuration, the obturator elements 200 can be fully retracted out of a flow path of the dilating disk valve assembly 100. As described more fully herein, the dilating disk valve assembly 100 can include or otherwise be shifted into the closed configuration and can include a sealing ring 700. As described more fully herein, the obturator elements 200 can abut and/or compress the sealing ring 700, which can help create a fluid-tight seal between the obturator elements 200, the sealing ring 700, and/or one or more surfaces of a housing of the dilating disk valve assembly 100.

Referring now to FIGS. 2-6, the obturator element 200 can be composed of, and/or comprise, a single material. For example, the obturator element 200 can be composed of, or comprise, a metal. As more specific examples, the obturator element 200 can be composed of, or comprise, steel, titanium, aluminum, or any other metal compound.

The obturator element 200 can have a generally petal-like shape. The obturator element 200 can include a top surface 201, an outer side surface 202, a curved surface 203, an inner side surface 204, and a bottom surface 205. The top surface 201 can be curved. The top surface 201 can extend continuously from a beveled edge 206 to the bottom surface 205.

The outer side surface 202 can be confined by the top surface 201, the bottom surface 205, and/or the curved surface 203. Stated otherwise, the outer side surface 202 can have edges or boundaries at least partially bounded partially by the top surface 201, the bottom surface 205, and/or the curved surface 203 (or another surface of the recessed portion, as described more fully herein). The outer side surface 202 can be substantially planar and can exhibit no curved or undulating areas. The outer side surface 202 can include a control aperture 111 and a hinge aperture 112. The control aperture can be configured to at least partially receive a controlling pin 1302 (see, e.g., FIG. 13), and the hinge aperture 112 can be configured to at least partially receive a hinge pin 1303. The hinge pin 1303 can be substantially statically positioned, and the controlling pin 1002 can be dynamically positioned. As such, the obturator element 200 can rotate about the hinge aperture 112 as the control aperture 111 is pulled or pushed by a gear mechanism (see, e.g., FIGS. 13-14). Such rotation about the hinge aperture can cause the obturator element 200 to open or close.

The obturator element 200 can include a recessed portion that is recessed with respect to the outer side surface 202. The recessed portion can include the inner side surface 204. The recessed portion can include the inner side surface 204 and the curved surface 203. When included, the curved surface 203 can provide a smooth transition between the outer side surface 202 and the inner side surface 204.

The curved surface 203 can be confined by the outer side surface 202, the inner side surface 204, the top surface 201, and/or the bottom surface 205. Stated otherwise, the curved surface 203 can have edges or boundaries at least partially bounded by the outer side surface 202, the inner side surface 204, the top surface 201, and/or the bottom surface 205. The curved surface 123 can exhibit a substantially consistent/equal curvature or consistent/equal deviation from a straight line. The arc length of the curved surface 123 can be equal to 360 degrees divided by the number of obturator elements 200 included in the dilating disk valve assembly. For example, the curved surface 123 can be 120 degrees, equating to one-third of a circle, such that a dilating disk valve assembly including three obturator elements 200 can connect to form a complete circle. For example, as the three obturator elements 200 close, the curved surface 203 of each obturator element 200 connect at each end to form a circle (see FIG. 14 for more detail).

The inner side surface 204 can be confined by the top surface 201, the curved surface 203, and/or the bottom surface 205. Stated otherwise, the inner side surface 204 can have edges or boundaries at least partially bounded by the top surface 201, the curved surface 203, and/or the bottom surface 205. The inner side surface 204 can be substantially parallel to the outer side surface 202. The inner side surface 204 can have a substantially planar surface.

Figure 5:
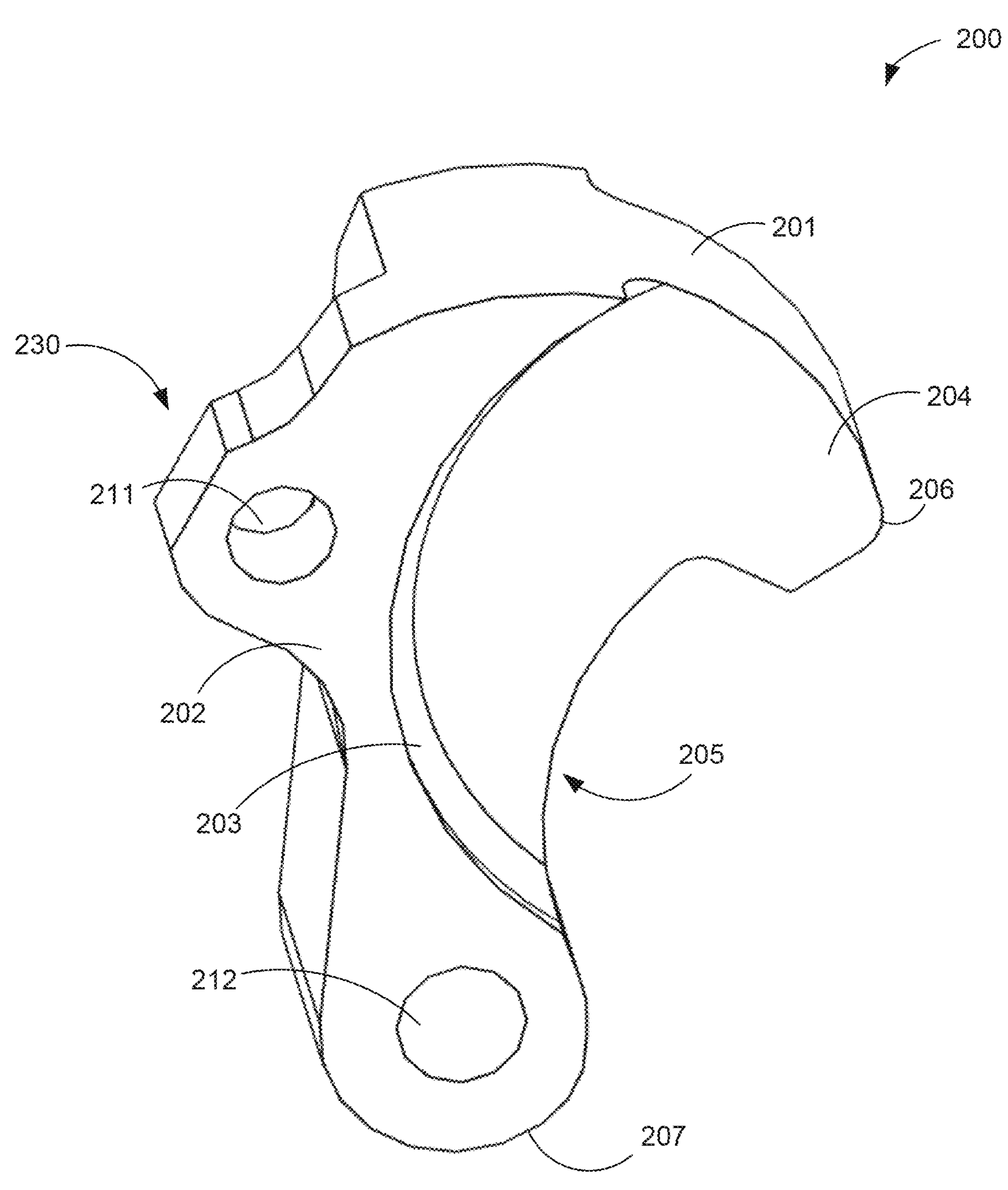
FIG. 5 illustrates a fourth perspective view of an example obturator element, in accordance with the disclosed technology.
Figure 6:
FIG. 6 illustrates a front view of an example obturator element, in accordance with the disclosed technology.
Figure 6:
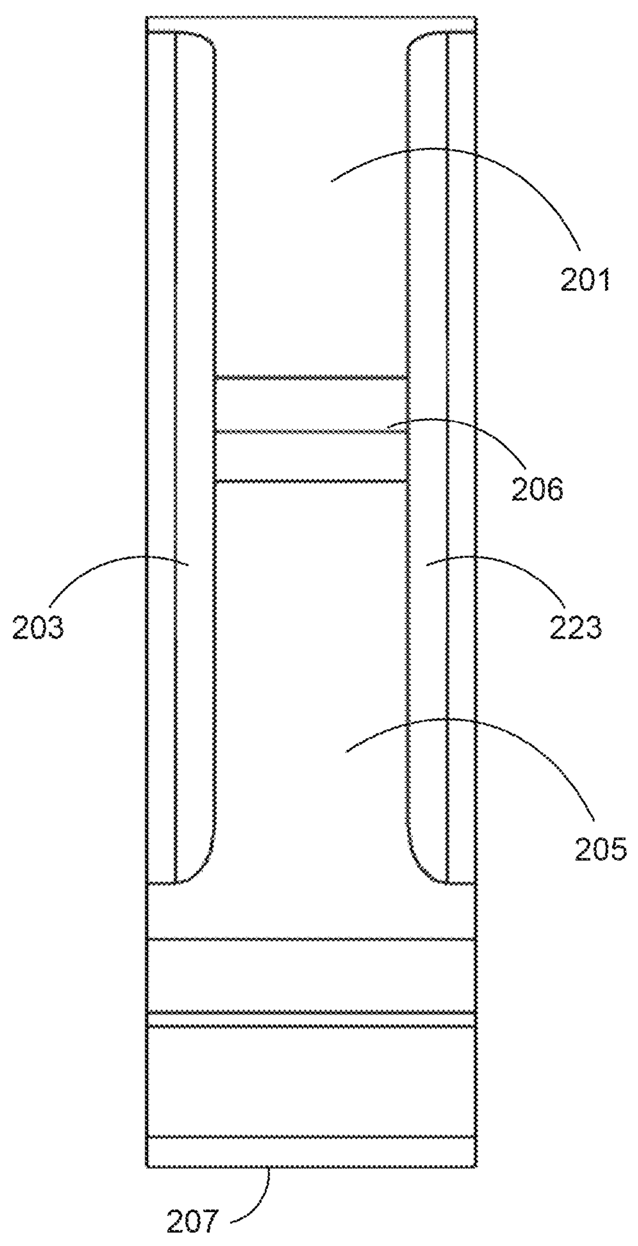
Figure 7:
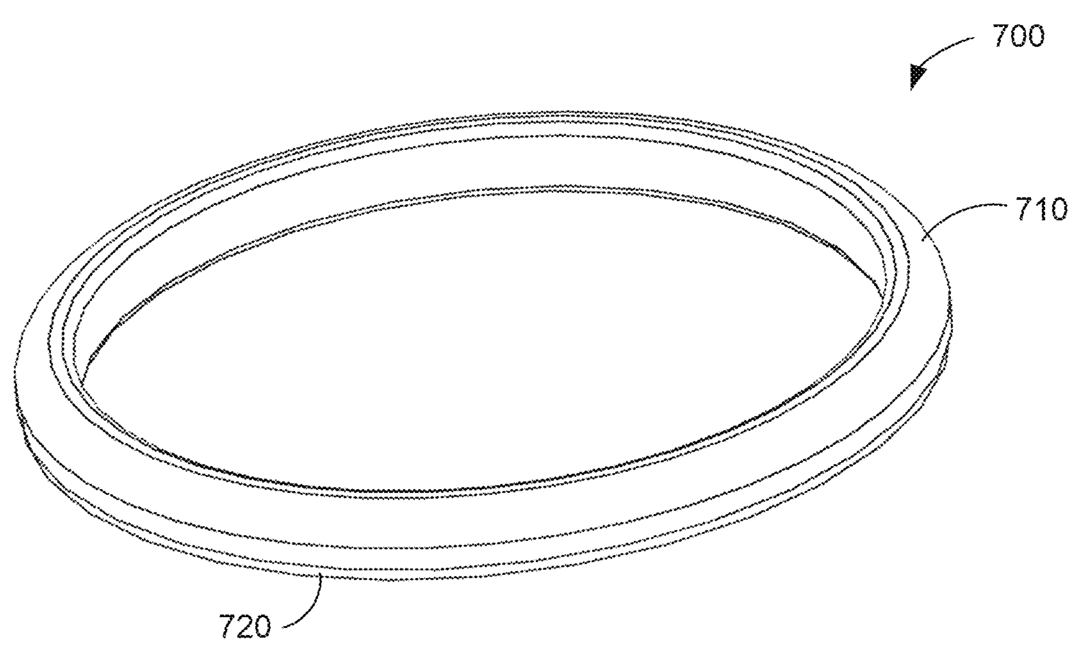
FIG. 7 illustrates a first perspective view of an example sealing ring, in accordance with the disclosed technology.
Figure 8:
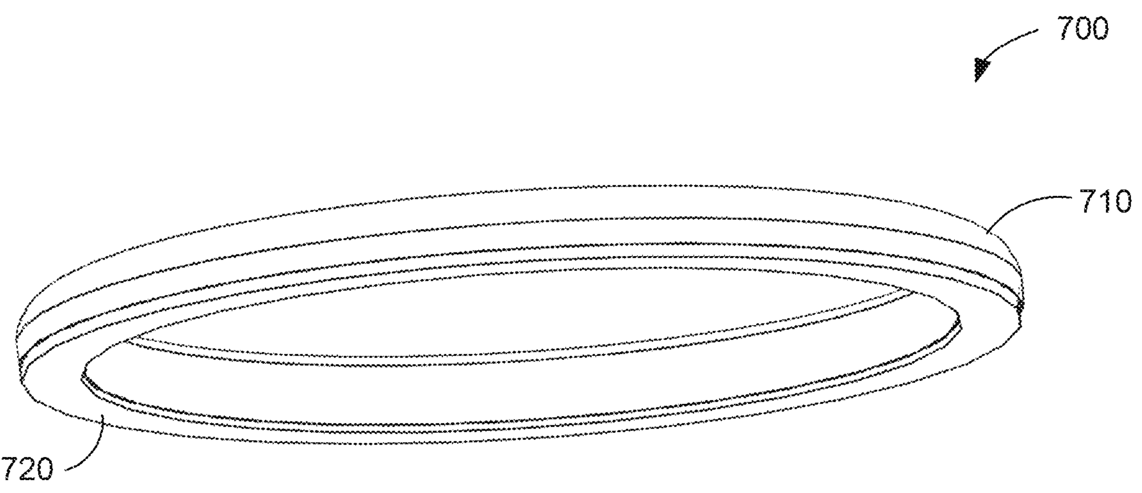
FIG. 8 illustrates a first perspective view of an example sealing ring, in accordance with the disclosed technology.
Figure 9:
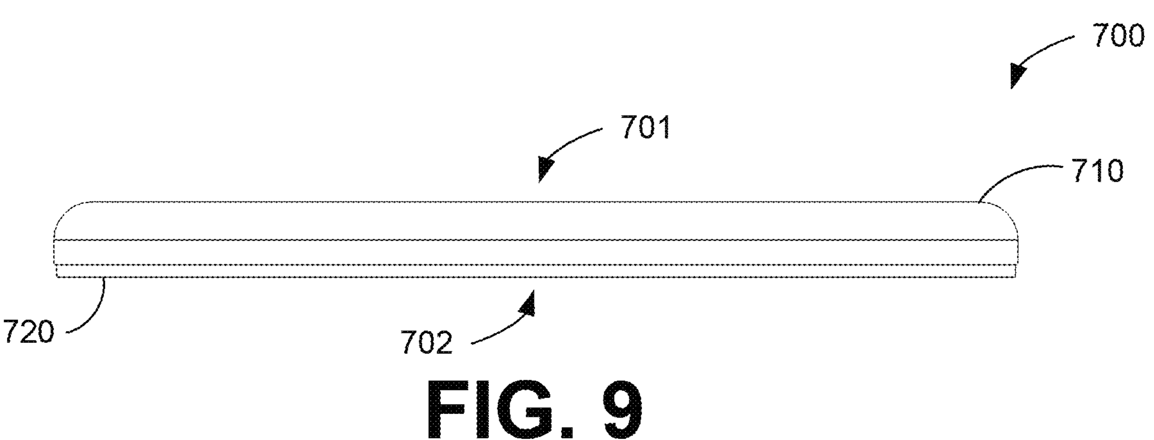
FIG. 9 illustrates a side view of an example sealing ring, in accordance with the disclosed technology.
Figure 10:
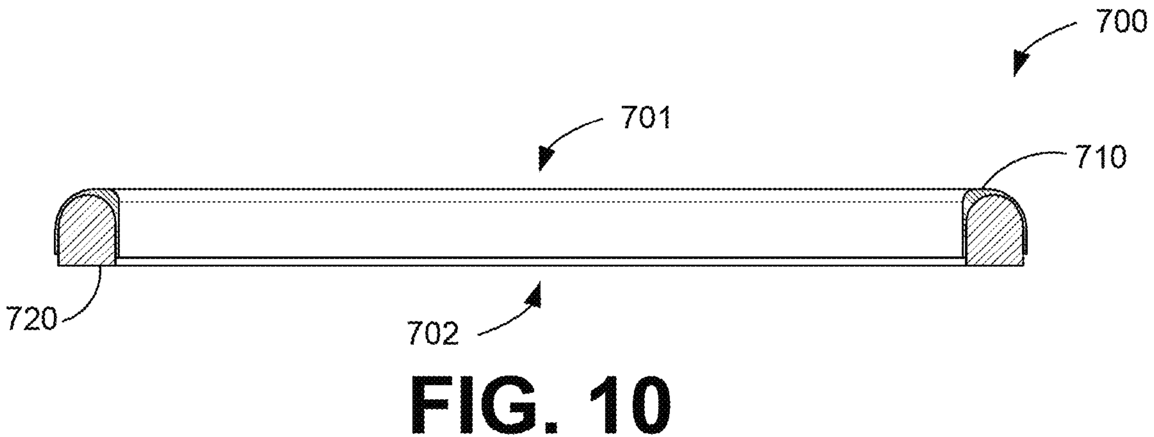
FIG. 10 illustrates a cross-sectional view of an example sealing ring, in accordance with the disclosed technology.
Figure 11:
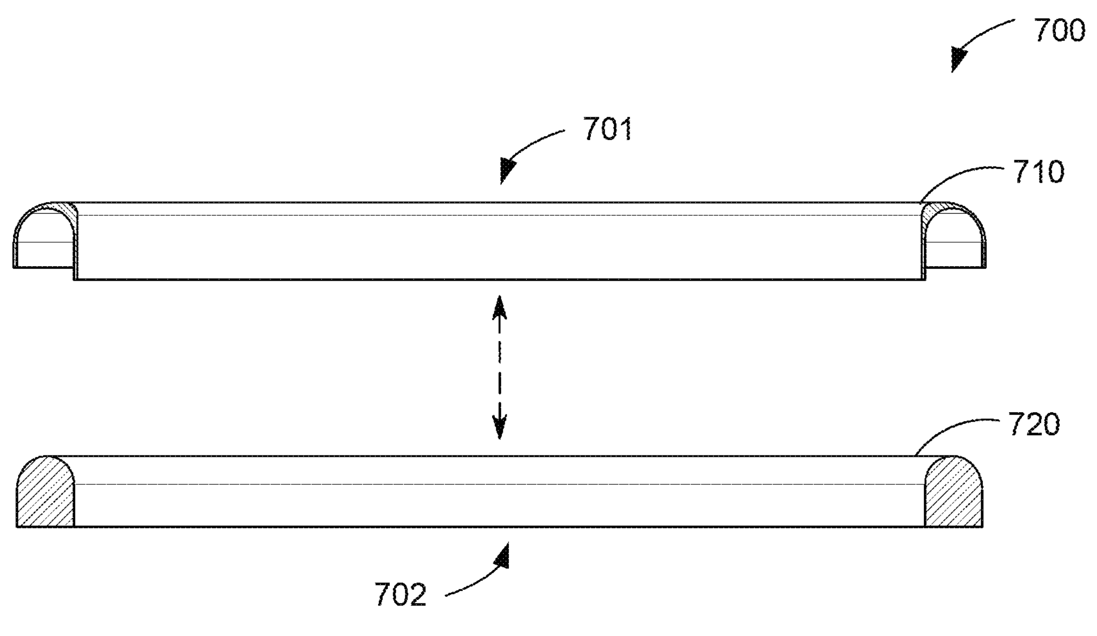
FIG. 11 illustrates an exploded, cross-sectional view of an example sealing ring, in accordance with the disclosed technology.

The bottom surface 205 can extend from the beveled edge 206 to a rounded edge 207. The bottom surface 205 can have various curves, which can be substantially similar in dimension to the curves of the top surface 201. In various examples, the bottom surface 205 can have a curved space proximate the beveled edge 206. The curved space of the bottom surface 205 with the beveled edge 206 and the top surface 201 may create a hook at the end of the obturator element 200, as best shown in FIG. 5. The upper portion of the hook is formed by the top surface 201 and the internal portion of the hook is formed by the bottom surface 205. The nose of the hook is formed proximate the meeting of the bottom surface 205 and the beveled edge 206 and primarily comprises the portion of the obturator element 200 bounded by the bottom surface 205 and the beveled edge 206.

Figure 13:
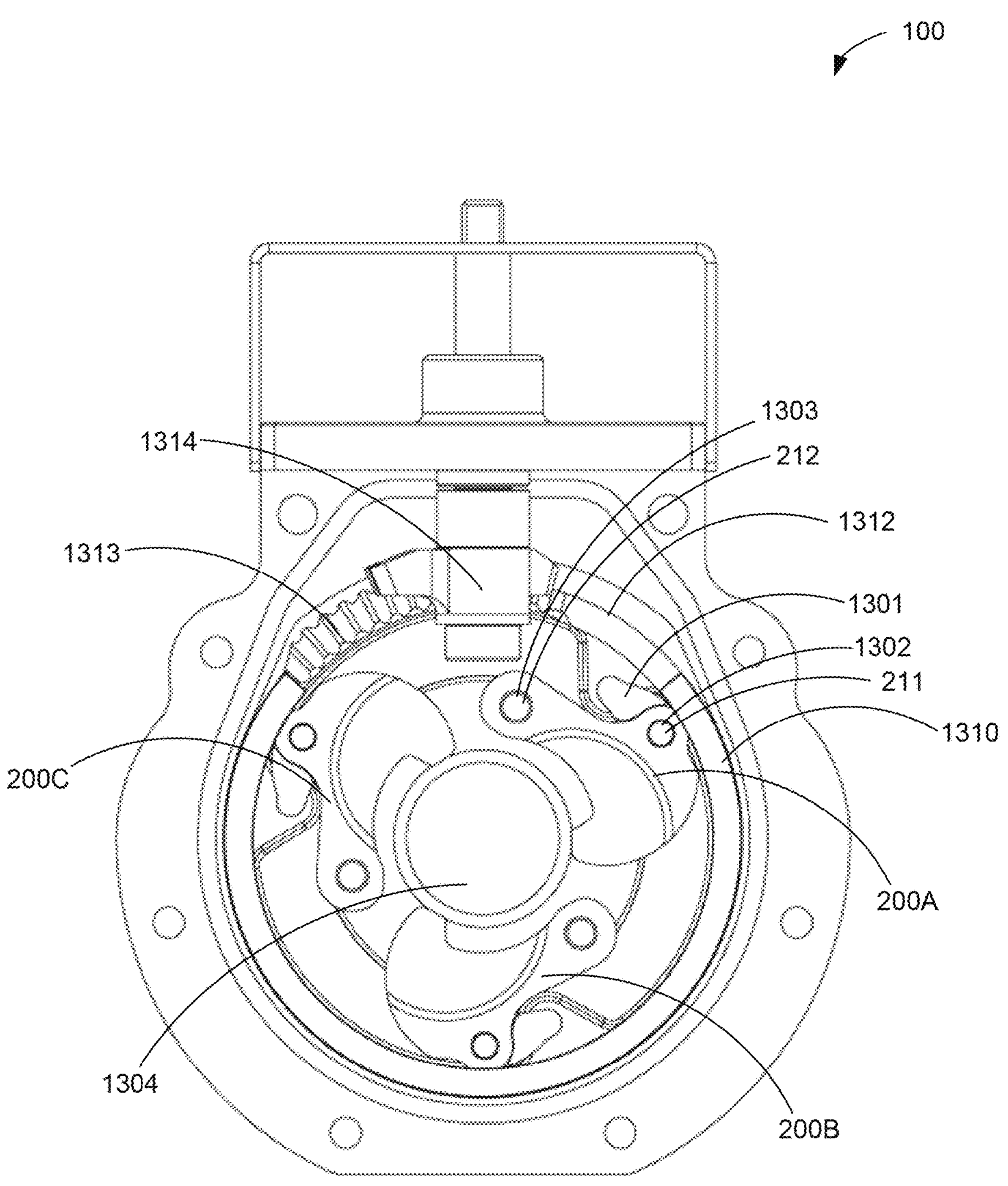
FIG. 13 illustrates a front view of an example dilating disk valve assembly in an open state, with certain components removed from view for clarity of illustration, in accordance with the disclosed technology.
Figure 14:
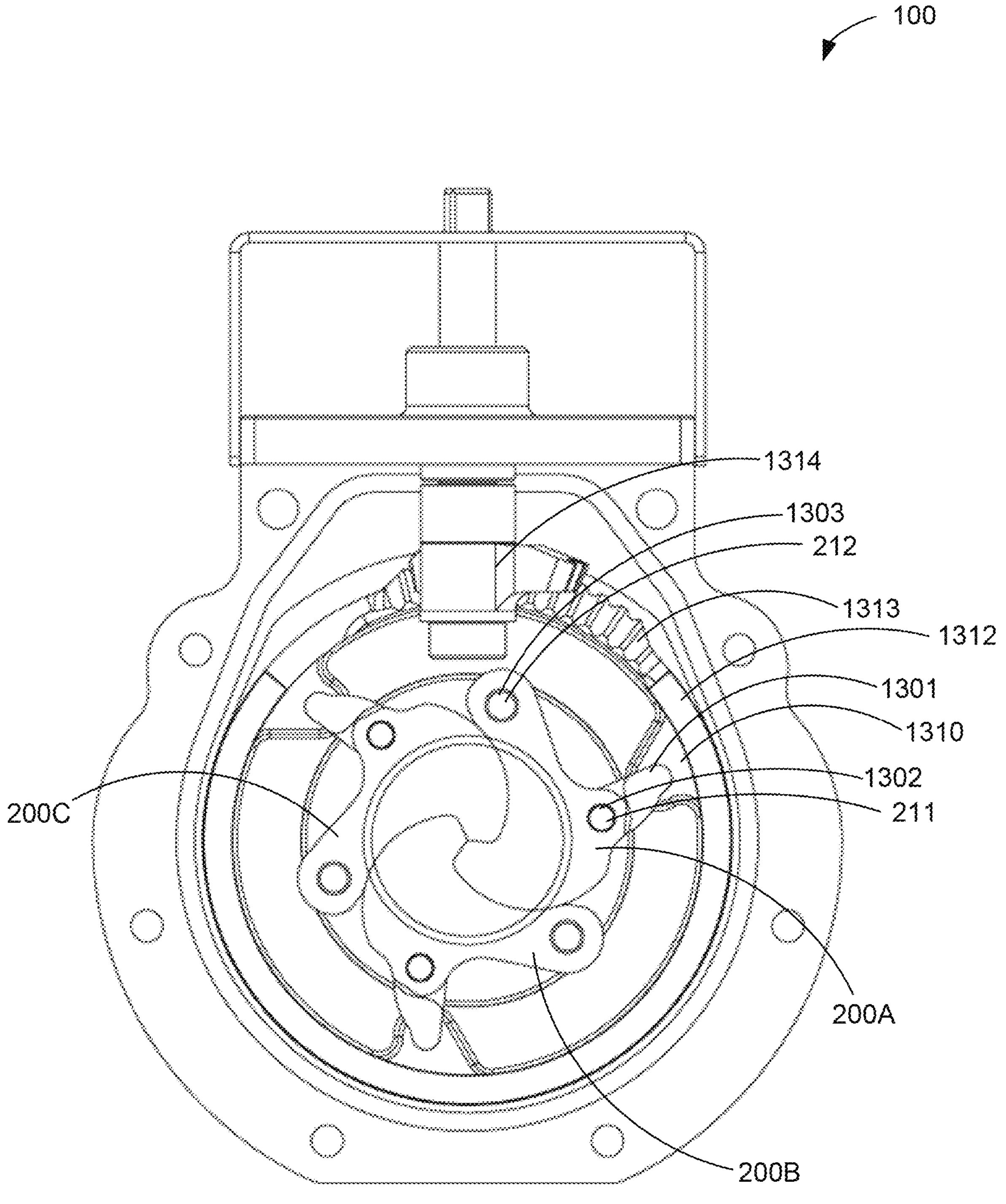
FIG. 14 illustrates a front view of an example dilating disk valve assembly in a closed state, with certain components removed from view for clarity of illustration, in accordance with the disclosed technology.
Figure 15:
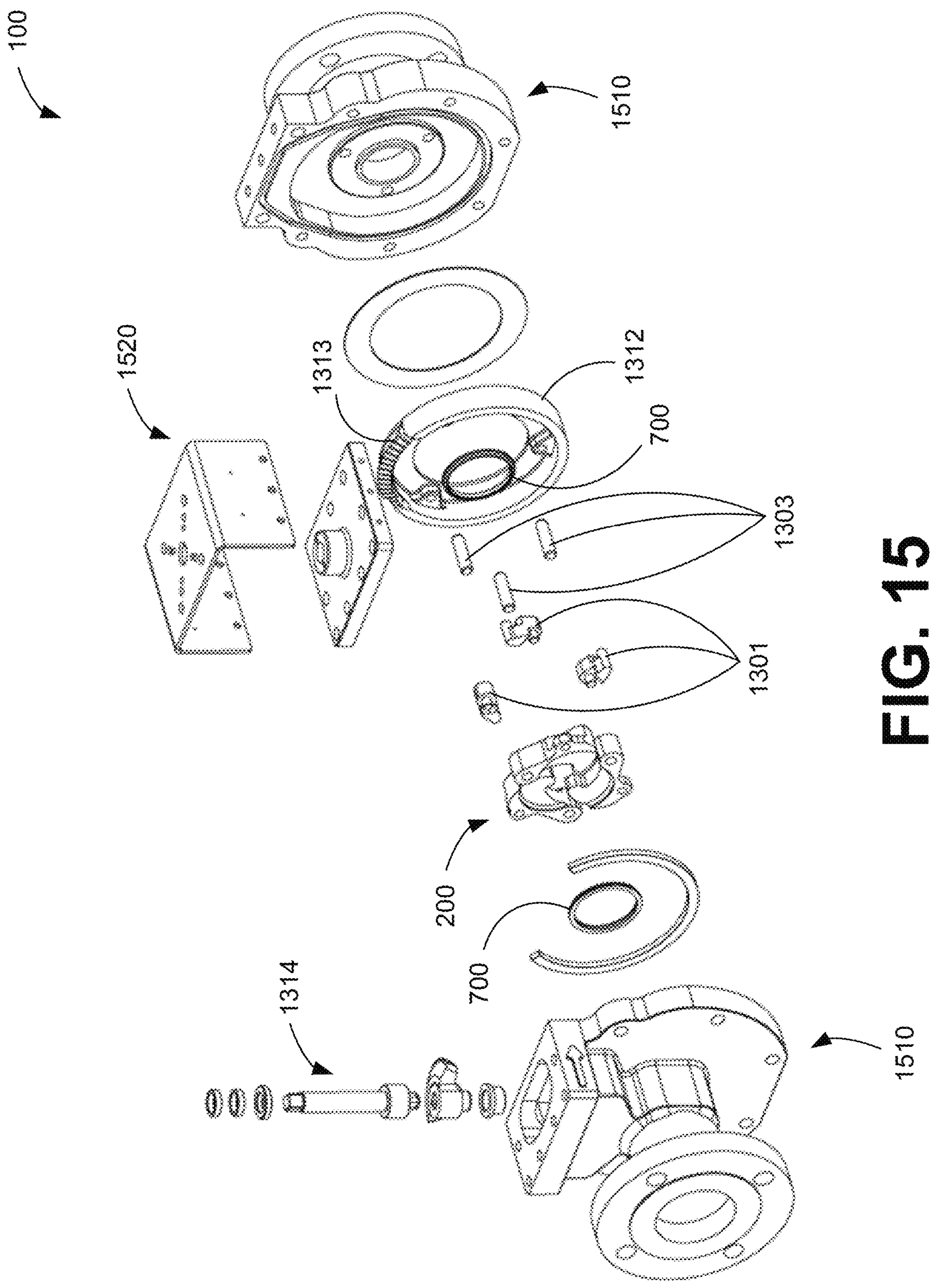
FIG. 15 illustrates exploded view of an example dilating disk valve assembly, in accordance with the disclosed technology.

As best shown in FIG. 14, the curved space of the bottom surface 205 of each obturator element 200 may be configured to receive the nose of the hook (e.g., the beveled edge 206) of an adjacent obturator element 200. As the plurality of obturator elements 200 are moved from an open position (FIG. 13) to a closed position (FIG. 14), the adjacent obturator elements 200 can interlock and create a seal at the bottom surface 205 of one obturator element 200 and the top surface 201 of the other obturator element 200 (see FIG. 14). The interlock between two adjacent obturator elements 200 may be formed by the contact between the beveled edge 206 of an obturator element 200 and the curved space of the bottom surface 205 of the adjacent obturator element 200, as shown in FIG. 14. The hooks and bottom surfaces 205 of each obturator element 200 interlock with adjacent obturators 200 to create a stronger seal. The hook being received by the curved space of an adjacent obturator element 200 creates a stronger interlock, at least because the obturator elements 200 must be rotated in order to be separated and cannot be pulled apart linearly.

The top surface 201 and the bottom surface 205 can substantially smooth. As described more fully herein, certain portions of the obturator element 200, such as the top surface 201 and the bottom surface 205, can be manufactured via electrical discharge machining (EDM). For example, the obturator element 200 can be manufactured via wire EDM techniques, sinker EDM techniques, fast hole drilling EDM techniques, or the like, or any combination thereof. Alternatively or in addition, the obturator element can be manufactured by other manufacturing techniques, such as high-pressure water cutting techniques, laser cutting techniques, various polishing techniques, or the like.

Thus, the top surface 201 and/or the bottom surface 205 can have a substantially smooth surface. For example, the largest imperfection (e.g., maximum microscopic peak or valley relative to the intended surface, such as a reference plane or a reference plane curve or a mean line) can be approximately 25 microns or less. Alternatively or in addition, the largest imperfection of the top surface 201 and/or the bottom surface 205 can be 20 microns or less, 17 microns or less, 15 microns or less, 12 microns or less, 10 microns or less, 8 microns or less, and/or 5 microns or less. As additional (but non-limiting) examples, the largest imperfection of the top surface 201 and/or the bottom surface 205 can be less than approximately 20 microns, between approximately 15 microns and approximately 20 microns, between approximately 10 microns and approximately 15 microns, less than approximately 10 microns, between approximately 8 microns and approximately 10 microns, between approximately 7 microns and approximately 9 microns, between approximately 5 microns and approximately 8 microns, or between approximately 1 micron and approximately 5 microns.

Stated otherwise, the top surface 201 and/or the bottom surface 205 can have a near-zero surface roughness. As will be understood by one having skill in the art, surface roughness can be measured in units of roughness average ("Ra"), which can be defined as the arithmetic average of the absolute values of the profile height deviations from the mean line, recorded within the evaluation length per ASME B46.1 (2019), or root mean square ("RMS" or "Rq"), which can be defined as the root mean square of the values of the profile height deviations from the mean line, recorded within the evaluation length. Ra can be calculated as the roughness average of a surface's measured microscopic peaks and valleys, whereas RMS can be calculated as the root mean square of a surface's measured microscopic peaks and valleys. The surface roughness of the top surface 201 and/or the bottom surface 205 can be between less than approximately 120 micro-inch RMS, approximately 60 micro-inch RMS and approximately 120 micro-inch RMS, less than approximately 60 micro-inch RMS, between approximately 15 micro-inch RMS and approximately 60 micro-inch RMS, less than approximately 20 micro-inch RMS, less than approximately 15 micro-inch RMS, or between approximately 5 micro-inch RMS and approximately 15 micro-inch RMS. Alternatively or in addition, the surface roughness of the top surface 201 and/or the bottom surface 205 can be between approximately less than approximately 120 micro-inch Ra, 60 micro-inch Ra and approximately 120 micro-inch Ra, less than approximately 60 micro-inch Ra, less than approximately 30 micro-inch Ra, between approximately 12 micro-inch Ra and approximately 30 micro-inch Ra, less than approximately 12 micro-inch Ra, between approximately 12 micro-inch Ra and approximately 60 micro-inch Ra, or between approximately 4 micro-inch Ra and approximately 12 micro-inch Ra.

Alternatively or in addition to EDM techniques, one or more portions of the obturator element 200 (e.g., the top surface 201 and/or the bottom surface 205) can be cut or finished high-pressure water cutting techniques or laser cutting techniques. In any event, the obturator element 200 can have near-zero surface roughness qualities as described herein. That is to say, the obturator element 200 (or portions thereof) can be manufactured according to any manufacturing process, or combination of manufacturing processes, to establish a substantially smooth surface (e.g., a near-zero surface roughness).

Figure 2:
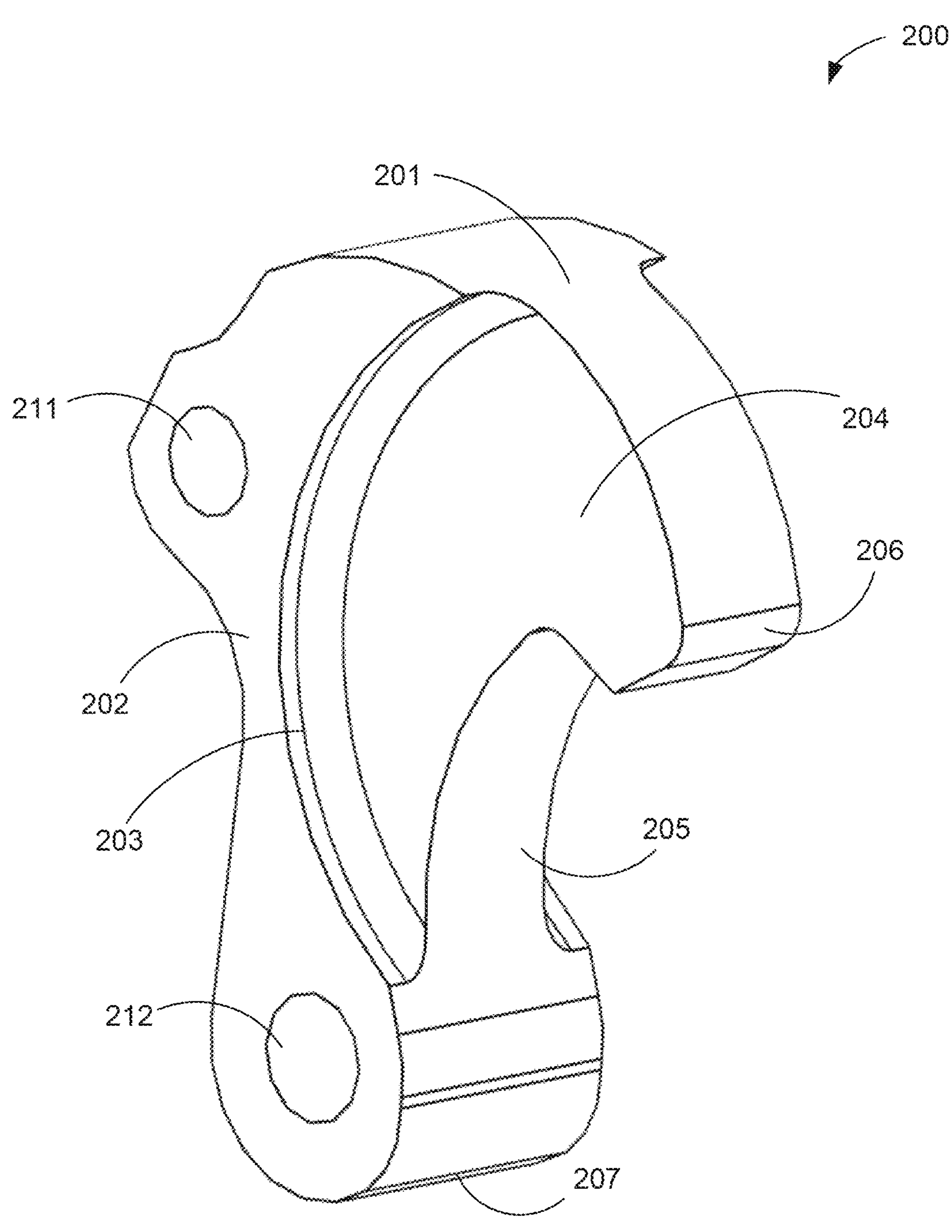
FIG. 2 illustrates a first perspective view of an example obturator element, in accordance with the disclosed technology.
Figure 3:
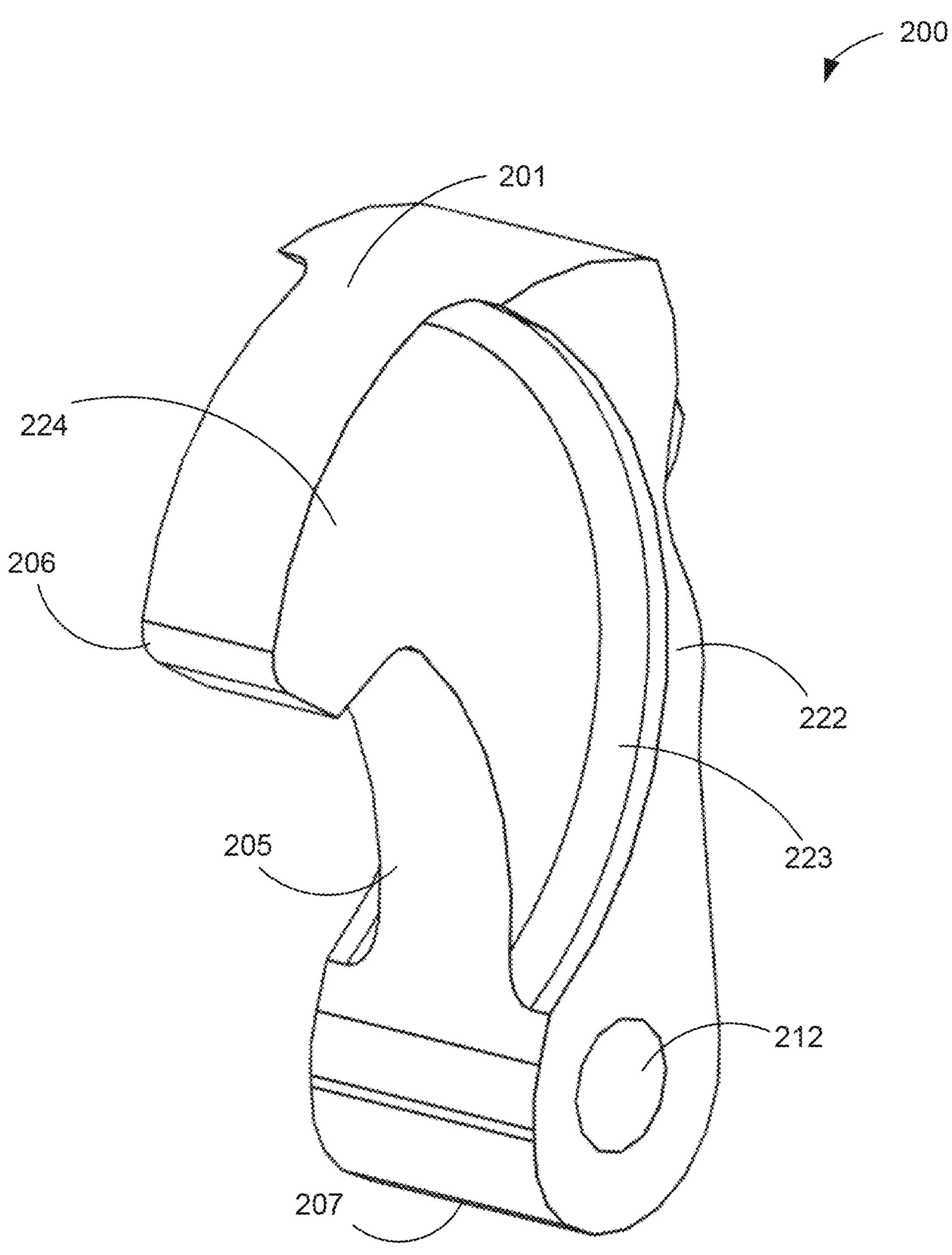
FIG. 3 illustrates a second perspective view of an example obturator element, in accordance with the disclosed technology.

Comparing FIG. 2 to FIG. 3, for example, the obturator element 200 can include a second side that substantially mirrors the first side. For example, the outer side surface 202 can be a first outer side surface 202, the curved surface 203 can be a first curved surface 203, and the inner side surface 204 can be a first bottom surface 205. The obturator element 200 can include a second outer side surface 222, a second curved surface 223, and a second inner side surface 224. The second curved surface 223 can be substantially similar to the first curved surface 203. The second inner side surface 224 can be substantially similar to the first inner side surface 204. For example, the second inner side surface 224 can be planer and/or can be free of any particular curved or undulating areas. The second outer side surface 202 can be substantially similar to the first outer side surface 202. For example, the second outer side surface 222 can be planer and/or can be free of any particular curved or undulating areas.

The second outer side surface 222 can omit the control aperture 211. That is to say, the control aperture 211 can be or comprise a blind hole having a defined depth within the body of the obturator element 200, relative the first outer side surface 202. Alternatively, the second outer side surface 222 can include the control aperture 211, such that the control aperture 211 is a through-hole extending between the first outer side surface 202 and the second outer side surface 222. The second outer side surface 222 can include the hinge aperture 212. That is, the hinge aperture 212 can be or comprise a through-hole extending between the first outer side surface 202 and the second outer side surface 222.

Figure 4:
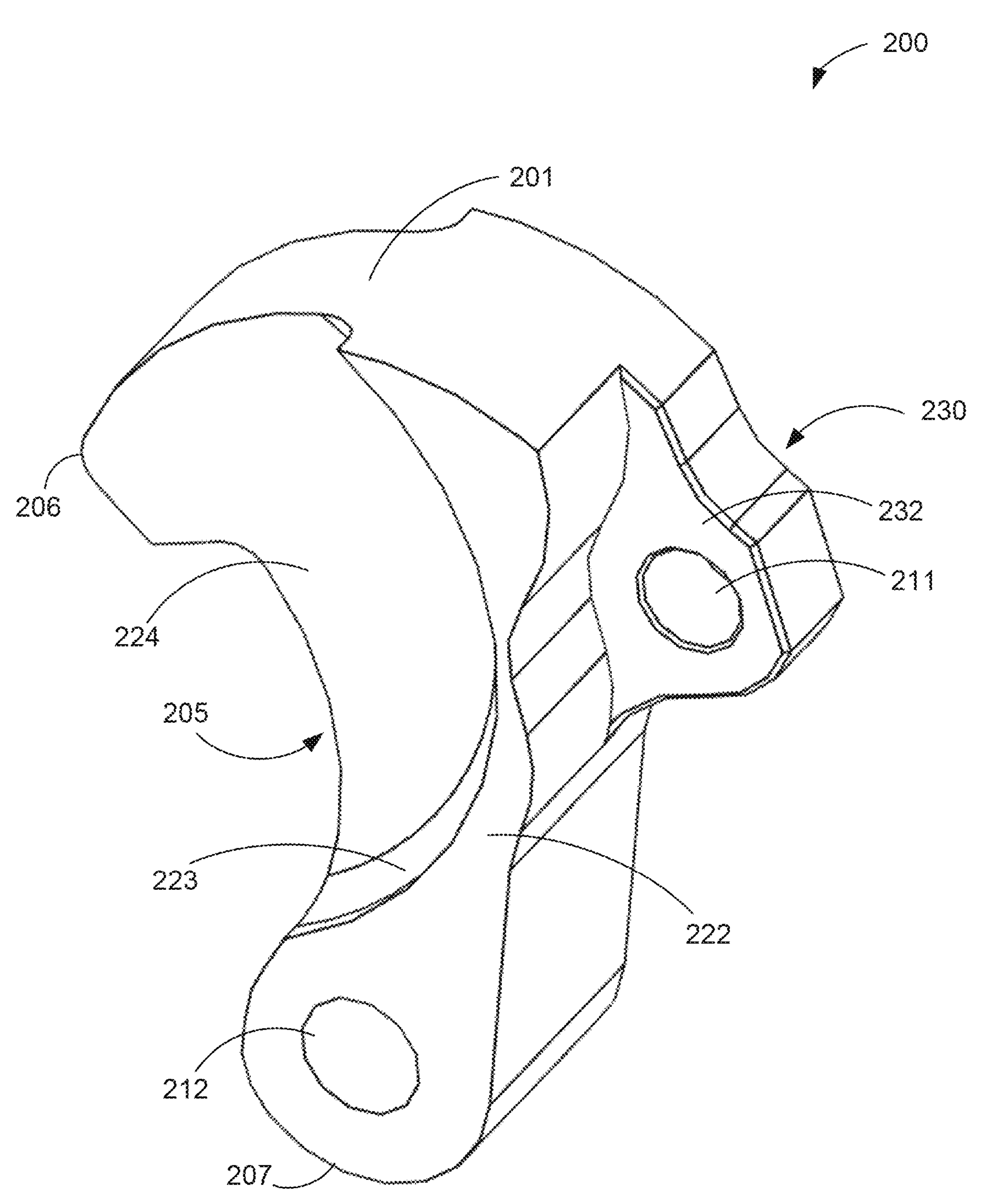
FIG. 4 illustrates a third perspective view of an example obturator element, in accordance with the disclosed technology

Alternatively or in addition, and referring to FIGS. 4 and 5, the obturator element 200 can include a controlling pin portion 230, which can have a first surface 231 coinciding with a portion of the first outer side surface 202 (see FIG. 5) and a second surface 232 opposite the first surface 231. The second surface 232 can be generally parallel to the first surface 231. The thickness of the controlling pin portion 230 (e.g., the distance between the first surface 231 and the second surface 232) can be less than the thickness of the obturator element 200 (e.g., the distance between the first outer side surface 202 and the second outer side surface 222).

As shown in FIGS. 7-11, the sealing ring 700 can include a ring body 710 and a sealing insert 720. The ring body 710 can be composed of, or comprise, a metal. For example, the ring body 710 can be composed of, or comprise, steel, titanium, aluminum, or any other metal compound. The ring body 710 can be composed or, or comprise, the same material as the obturator element 200. Alternatively, the ring body 710 can be composed or, or comprise, a material that is different from that of the obturator element 200. The sealing insert 720 can be composed of, or comprise, graphite, polytetrafluoroethylene (PTFE), an elastomer, or the like. Alternatively or in addition, the sealing insert can be composed of, or comprise, any material (or combination of materials) compatible with the fluid to be flown through the dilating disk valve assembly 100 (e.g., non-reactive with the fluid), while also providing a sufficient amount of energizing force to the sealing ring (e.g., a spring-energized force).

The sealing ring 700 (e.g., the ring body 710 and the sealing insert 720) can have a first side 701 that is rounded, and the sealing ring 700 (e.g., the sealing insert 720) can have a substantially planar second side 702. The first side 701 of the ring body 710 can be closed and rounded, and the second side 702 of the ring body 710 can be open. The sealing insert 720 can be configured to at least partially insert into the open second side 702 of the ring body 710 to thereby form the sealing ring 700. The second side 702 of the sealing insert 720 can extend outwardly farther than the second side 702 of the ring body 710 such that the sealing insert 720 can form all or substantially all of the second side 702 of the sealing ring 700.

Figure 12:
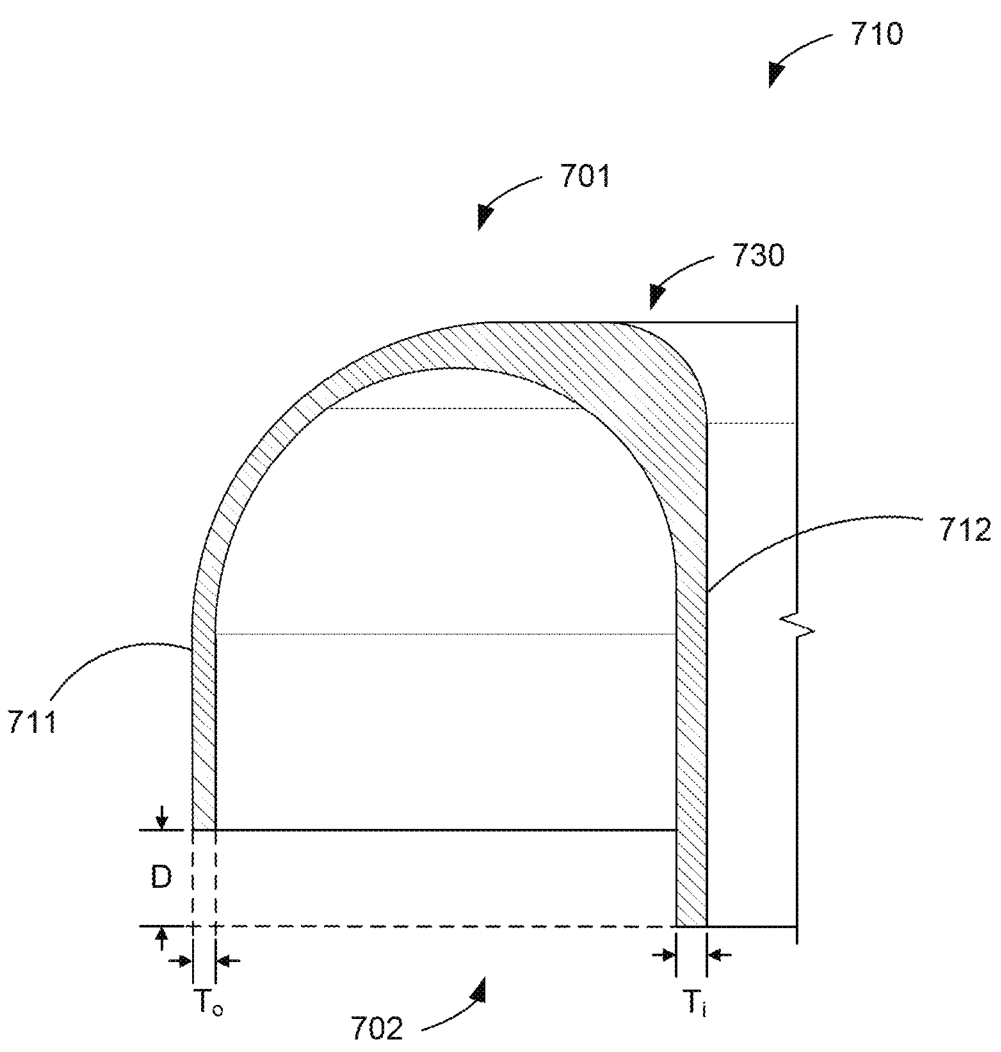
FIG. 12 illustrates a magnified view of a cross-section of a ring body of an example sealing ring, in accordance with the disclosed technology.

Referring to FIG. 12, the ring body 710 can have a substantially C-shaped cross-section. The ring body 710 can include an outer wall 711 and an inner wall 712. The outer wall 711 can be located at a radially outward position relative to the inner wall 712. The inner wall 712 can have a height that is greater than the height of the outer wall 712. For example, the inner wall 712 can extend a distance D farther in the direction of the second side 702 than the outer wall 711. Alternatively, the outer wall 711 can have a height that is greater than the height of the inner wall 712. Alternatively, the inner wall 712 and outer wall 711 can have substantially equal heights.

The outer wall 711 can have a thickness $T_o$ that is less than a thickness $T_i$ of the inner wall 712. The thickness $T_o$ of the outer wall 711 can be equal to or less than approximately half of the thickness $T_i$ of the inner wall 712. Alternatively or in addition, the thickness $T_o$ of the outer wall 711 can be equal to or less than approximately three-eighths of the thickness $T_i$ of the inner wall 712. Alternatively or in addition, the thickness $T_o$ of the outer wall 711 can be equal to or less than approximately one-third of the thickness $T_i$ of the inner wall 712. Alternatively or in addition, the thickness $T_o$ of the outer wall 711 can be equal to or less than approximately one-quarter of the thickness $T_i$ of the inner wall 712. As a more specific (and non-limiting) example, the thickness $T_o$ of the outer wall 711 can be approximately 0.007 inch, and the thickness Ti of the inner wall 712 can be approximately 0.020 inch. Alternatively or in addition, the ratio of the thickness $T_o$ of the outer wall 711 to the thickness $T_i$ of the inner wall 712 can be approximately 7 to approximately 20 (e.g., approximately 0.35). Alternatively or in addition, the ratio of the thickness $T_o$ of the outer wall 711 to the thickness $T_i$ of the inner wall 712 can be approximately 7 to approximately 20 or less (e.g., less than approximately 0.35). Alternatively or in addition, the ratio of the thickness $T_o$ of the outer wall 711 to the thickness $T_i$ of the inner wall 712 can be approximately 1 to approximately 2 or less (e.g., equal to or less than approximately 0.5). Alternatively or in addition, the ratio of the thickness $T_o$ of the outer wall 711 to the thickness Ti of the inner wall 712 can be approximately 5 to approximately 21 or less (e.g., equal to or less than approximately 0.238). Alternatively or in addition, the ratio of the thickness $T_o$ of the outer wall 711 to the thickness $T_i$ of the inner wall 712 can be approximately 5 to approximately 20 or less (e.g., equal to or less than approximately 0.25). Alternatively or in addition, the ratio of the thickness $T_o$ of the outer wall 711 to the thickness $T_i$ of the inner wall 712 can be approximately 5 to approximately 19 or less (e.g., equal to or less than approximately 0.263). Alternatively or in addition, the ratio of the thickness $T_o$ of the outer wall 711 to the thickness $T_i$ of the inner wall 712 can be approximately 6 to approximately 21 or less (e.g., equal to or less than approximately 0.286). Alternatively or in addition, the ratio of the thickness $T_o$ of the outer wall 711 to the thickness $T_i$ of the inner wall 712 can be approximately 6 to approximately 20 or less (e.g., equal to or less than approximately 0.3). Alternatively or in addition, the ratio of the thickness $T_o$ of the outer wall 711 to the thickness $T_i$ of the inner wall 712 can be approximately 6 to approximately 19 or less (e.g., equal to or less than approximately 0.316). Alternatively or in addition, the ratio of the thickness $T_o$ of the outer wall 711 to the thickness $T_i$ of the inner wall 712 can be approximately 7 to approximately 21 or less (e.g., equal to or less than approximately 0.333). Alternatively or in addition, the ratio of the thickness $T_o$ of the outer wall 711 to the thickness $T_i$ of the inner wall 712 can be approximately 7 to approximately 19 or less (e.g., equal to or less than approximately 0.368).

The ring body 710 can have a corner portion 730 located proximate the transition from the inner wall 712 to the first side 701, and the corner portion 730 can have a thickness greater than the thickness $T_i$ of the inner wall 712. The corner portion 730 can have a thickness greater than the thickness $T_o$ of the outer wall 711. As a non-limiting example, the thickness of the corner portion 730 can have a maximum thickness that is at least approximately 2 times, approximately 3 times, or approximately 4 times the thickness $T_o$ of the outer wall 711.

The various values of thicknesses $T_o$, Ti discussed herein can correspond to thickness measurements taken at the open edge the corresponding walls 711, 712, respectively. Alternatively or in addition, the various values of thicknesses $T_o$, Ti can correspond to maximum thickness values of the corresponding walls 711, 712, respectively. In such cases, the maximum thickness values can relate to the maximum thickness of the walls or wall portions that extend in the axial direction (i.e., a direction extending from the closed side of the ring body 710 to the open side of the ring body 710). That is to say, the maximum thickness values can correspond to the walls or wall portions that begin after the ring body's 710 curved transition from the closed side of the ring body 710 and extend in the axial direction to the outermost edge of the corresponding wall 711, 712 of the ring body 710. As a specific example, the maximum thickness values can omit the dimensions of the corner portion 730.

Accordingly, the sealing ring 700 can be configured to selectively and repeatedly flex to create a seal and unflex to release the seal. Thus, the sealing ring 700 can be configured to have sufficient flexibility to create the seal but also have sufficient rigidity to return to its original shape. Therefore, the inner wall 712 and/or the corner portion 730 can provide sufficient rigidity and durability for the sealing ring 700, whereas the outer wall 711 can provide sufficient malleability (e.g., due to the comparatively thin wall thickness of the outer wall 711) to deform to form a seal (e.g., with the obturator elements 200 or another surface of the dilating disk valve assembly 100).

Referring now to FIG. 13, an example dilating disk valve assembly 100 is shown in an open configuration with certain components being hidden so as to illustrate the inner workings of the dilating disk valve assembly 100. As illustrated, the dilating disk valve assembly 100 includes three obturator elements 200A, 200B, 200C, although the disclosed technology is not so limited.

The dilating disk valve assembly 100 can include a controlling arm 1301, a controlling pin 1302, a hinge pin 1303, and an aperture 1304. A corresponding controlling arm 1301 can connect to each obturator element 200A-200C using the corresponding controlling pin 1302. The controlling pin 1302 can be an extension of (or a separate component attached or connected to) the controlling arm 1301 and can insert into the control aperture 211. The controlling pins 1302 can transfer force onto the obturator elements 200A-200C to open or close the aperture 1304 of the dilating disk valve assembly 100. For example, the controlling arm 1301 can be in mechanical communication with gear mechanism, which can rotate clockwise to apply a force to the obturator elements 200A-200C via the controlling pins 1302. Continuing this example, as more force is exerted on the obturator elements 200A-200C, the obturator elements 200A-200C can begin to rotate in a clockwise direction, ultimately causing the obturator elements 200A-200C to close.

The obturator elements 200A-200C can rotate about the hinge pin 1303. The hinge pin 1303 can be inserted into the hinge aperture 212 and can be substantially anchored (e.g., static, stationary). The hinge pin 1303 can be attached to the frame of the dilating disk valve assembly 100 to anchor the obturator elements 200A-200C to a particular location. Anchoring the obturator elements 200A-200C at the location of the hinge pin 1003 can facilitate the obturator elements 200A-200C rotating about that location. For example, as a force is exerted by the controlling arm 1301 in a clockwise direction, the obturator elements 200A-200C are pulled in the clockwise direction. Continuing this example, the obturator elements 200A-200C rotate about the hinge pin 1303. Continuing this example, the obturator elements 200A-200C can continue to rotate until all obturator elements 200A-200C have met at the center of the aperture 1304 of the dilating disk valve assembly 100.

The dilating disk valve assembly 100 can include a gear mechanism, which can provide the necessary forces to open or close the dilating disk valve assembly 100. Referring to FIG. 13, the gear mechanism can include the controlling arm 1301 and a controlling base 1310. The controlling base 1310 can be fixed to a rotating ring portion 1312, which can be attached or otherwise connected to an annular gear portion 1313. The controlling arm 1301 can include a controlling base pin that can connect to the controlling base 1310. The controlling base pin can be inserted into a controlling base aperture of the controlling arm 1301. The controlling base pin can be inserted into the controlling base aperture and rotate freely to pivot around the controlling base 1310. Alternatively, the controlling arm 1301 can include an integral pin or other projection extending therefrom, and the integral pin of the controlling arm 1301 can be inserted into the controlling base aperture of the controlling arm 1301. Regardless, as the controlling base 1310 rotates to a closed position, the controlling base 1310 moves with the rotating ring portion 1312, by forces received via the annular gear portion 1312, in a first direction (e.g., clockwise or counterclockwise). Continuing this example, as the controlling base 1310 moves to the first direction, the controlling base 1310 transfers force to the controlling arm 1301 and the obturator element 200 in a similar direction. Continuing this example, as the obturator element 200 begins to rotate inwards around the hinge pin 1303, the controlling arm 1301 rotates about the pin and/or the controlling base aperture, the controlling arm 1301 rotating inwardly toward the aperture 1304. Continuing this example and depending on the particular configuration of the dilating disk valve assembly 100 (e.g., the number of obturator elements 200 included), the controlling arm 1301 can extend perpendicularly from the controlling base 1310 once the obturator element 200 is in a completely closed state.

Referring now to FIG. 14, the dilating disk valve assembly 100 is shown in a closed state. While the figures herein show the dilating disk valve assembly 100 in a fully open and a fully closed state, it should be understood that the obturator elements 200 can transition to a plurality of intermediate open states (e.g., positions between the fully open state and the fully closed state). The dilating disk valve assembly 100 can include the rotating ring portion 1312, the annular gear portion 1313, and a turning device 1314. The annular gear portion 1313 can include gear teeth or threads, which can mate with corresponding gear teeth or threads of the turning device 1314. The turning device 1314 can rotate clockwise or counterclockwise to move the controlling base 1310 in a clockwise or counterclockwise direction. The turning device 1314 can have vertical gear teeth or threads that mate with the gear teeth or threads of the annular gear portion 1313. Thus, as the turning device 1314, force is transferred to the controlling base 1310 via the annular gear portion 1313 and the rotating ring portion 1312. Stated otherwise, the pulling or pushing force from the turning device 1314 onto the annular gear portion 1313 can cause the rotating ring portion 1312 to rotate. The turning device 1314 can be operated mechanically or automatically. As an example, the turning device 1314 (or a controller configured to control operation of the turning device 1314) can be programmed to turn at particular intervals or for particular conditions. For example, if a leak is detected in corresponding tubing system, the turning device 1314 can rotate to close the obturator elements 200.

A plurality of controlling bases 1310 can be attached or connected to, or integral with, the rotating ring portion 11312. For example, the rotating ring portion 1312 can include a number of controlling bases 1310 equal to the number of obturator element valves 200. As a more specific example, in a three-obturator element system, three controlling bases 1310 can be affixed to, connected to, or integral with to the rotating ring portion 1312. When closing the obturator elements 200, the turning device 1314 can rotate clockwise, for example, and cause the rotating ring portion 1312 to rotate clockwise simultaneously. As the rotating ring portion 1314 rotates clockwise, the controlling bases 1310 can rotate in a clockwise direction. As the controlling bases 1310 rotate, a force can be transferred to the obturator elements 200 via, inter alia, the controlling arm 1301. As a counterclockwise force is exerted into the obturator elements 300, the controlling arm 1301 can rotate clockwise around the controlling base 1310, and the obturator elements 200 can rotate about the hinge pin 1303. The obturator elements 200 can be configured to join or abut in the middle of the aperture 1304 to form a seal.

As the obturator elements 200 converge (i.e., when transitioning from an open state to a fully closed state), the curved surface 203 or another circumferential (or partially circumferential) surface of each obturator element 200 can contact the sealing ring 700. The curves of the top surface 201 of a given obturator element 200 can match and mate with, or nest into, corresponding curves of the bottom surface 205 of an adjacent obturator element 200. And because the surface roughness of the top surface 201 and/or the bottom surface 205 is so low, the simple abutment of the top surface 201 and the bottom surface 205 can form a fluid-tight seal therebetween. Further, as the obturator elements 200 continue to converge in the middle of the aperture 1304, the obturator elements 200 can compress or otherwise press against the sealing ring 700, which can cause the ring body 710 to flex and/or cause the sealing material 720 to be pressed in close contact with the inner side surface 204 or another surface of the dilating disk valve assembly 100, such as a housing wall surface generally parallel and opposite the inner side surface 204. Accordingly, a fluid-tight seal can be achieved.

Figure 16:
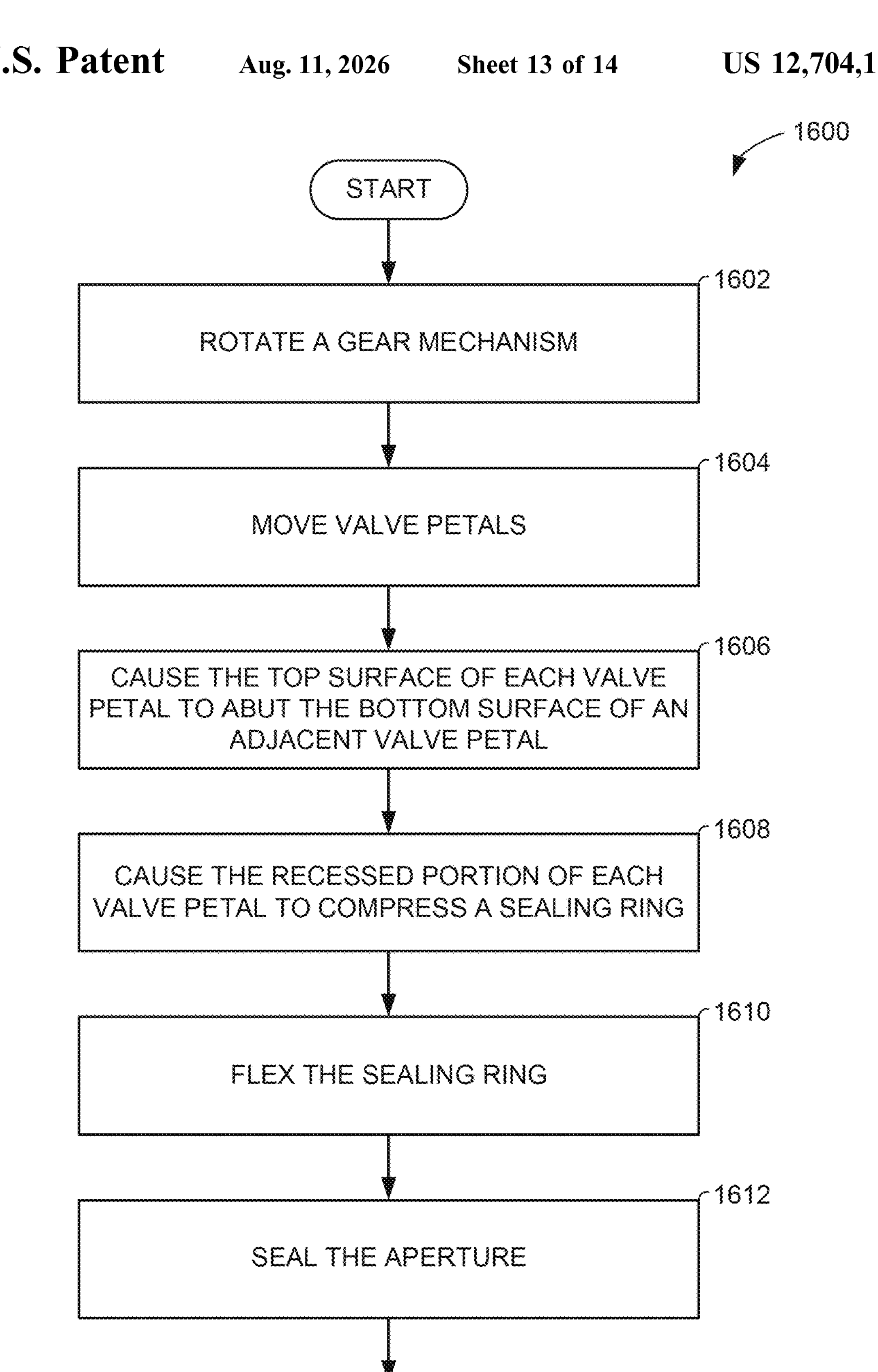
FIG. 16 illustrates a flowchart corresponding to a method for operating an example dilating disk valve, in accordance with the disclosed technology.

Referring now to FIG. 16, an exploded view of an example dilating disk valve assembly 100 is illustrated. The dilating disk valve assembly 100 can include one or more housing portions 1501. The dilating disk valve assembly 100 can include two or more obturator elements 200, such as the three obturator elements illustrated. The dilating disk valve assembly 100 can also include a corresponding number of controlling arms 1301 and hinge pins 1303. The dilating disk valve assembly 100 can include one or more sealing rings 700. For example, the dilating disk valve assembly 100 can include two sealing rings 700, as illustrated, which are positioned on either side of the obturator elements 200 such that either sealing ring 700 can be at least partially received by the recessed portions on either side of the obturator elements 200. The dilating disk valve assembly 100 can include the rotating ring portion 1312, along with the annular gear portion 1313, which can mechanically communicate with the turning device 1314. The dilating disk valve assembly 100 can further include a turning device housing 1520, which can help protect the turning device 1314 and components in communication therewith. As will be appreciated, the dilating disk valve assembly can include additional components beyond those expressly illustrated and/or described herein.

Referring now to FIG. 16, a method 1600 for operating an example dilating disk valve (e.g., dilating disk valve assembly 100) is disclosed. The method 1600 can correspond to the overall functionality of the disclosed system. For example, the method 1600 demonstrates operations for closing and sealing a valve for a pathway system.

The method 1600 can include rotating 1602 a gear mechanism. The gear mechanism can include the rotating ring portion 1312, the annular gear portion 1313, and the turning device 1314. The turning device 1314 can rotate and apply a pulling or pushing force on the rotating ring portion 1312 (e.g., a rotational force in a first direction or a second direction) via the mechanical communication between the turning device 1314 and the annular gear portion 1313. The force produce by the turning device 1314 and applied to the annular gear portion 1313 can translate the rotation of the turning device 1314 in one direction into the rotation of the rotating ring portion 1312 in the same direction. For example, if the turning device 1314 rotates in a counterclockwise direction, the turning device 1314 can cause the annular gear portion 1313 and the rotating ring portion 1312 to rotate in a counterclockwise direction. On the other hand, if the turning device 1314 rotates in a clockwise direction, the rotating ring portion 1312 can rotate in a clockwise direction.

The method 1600 can include moving 1604 a plurality of obturator elements 200. As the rotating ring portion 1312 begins to rotate in a particular direction, the plurality of controlling base 1310 follows the same path as the rotating arm 1201. For example, if the rotating ring portion 1312 rotates clockwise, the controlling bases 1310 rotate clockwise. Each controlling base 1310 can mechanically connect to a corresponding controlling arm 1301. The obturator elements 200 can each mechanically connect to a corresponding controlling arm 1301 and a corresponding hinge pin 1303. As the controlling base 1310 rotates, the controlling arm 1301 pulls the obturator elements 200 in the direction of rotation. As the obturator elements 200 are pulled by the controlling arm 1301, the obturator elements 200 can begin to rotate about the fixed hinge pins 1303. For example, if the rotating ring portion 1312 rotates in a clockwise direction, the obturator elements 200 can rotate about the hinge pins 1303 in a clockwise direction. Continuing this example, the obturator elements 200 can begin to approach a closed or sealed state as they continue to rotate (e.g., in a clockwise direction as illustrated).

The method 1600 can include causing 1606 the top surface 201 of each obturator element 200 to abut the bottom surface 205 of an adjacent (e.g., adjacent in the clockwise direction as illustrated) obturator element 200. As described herein, the surface roughness of the top surfaces 201 and the bottom surfaces 205 can be sufficiently low such that contact between neighboring obturator elements 200 can be fluid-tight or approximately fluid-tight. The method 1600 can include causing 1608 the recessed portion of each obturator element 200 (e.g., the inner side surface 204 and/or the curved surface 203) to contact and/or compress the sealing ring 700. The method 1600 can include flexing 1610 the sealing ring 700, such as via the transfer of compressive forces against the sealing ring 700 and the engineered selective deformability of the sealing ring 700. One or more portions of the sealing ring can contact a surface, such as a surface of one or more obturator elements 200 and/or a surface of the surrounding valve housing, to thereby provide a seal (e.g., a fluid-tight or approximately fluid-tight seal) between the sealing ring 700 and the surface.

Thus, the method 1600 can include sealing 1612 the aperture (e.g., aperture 1304) to restrict fluid and/or material flow. The rotating ring portion 1312 can lock into place after the obturator elements 200 couple together (e.g., abut one another). Locking the rotating ring portion 1312 can facilitate a continued and/or constant seal between the obturator elements 200 and/or between the sealing ring 700 one or more surfaces as described herein.

Figure 17:
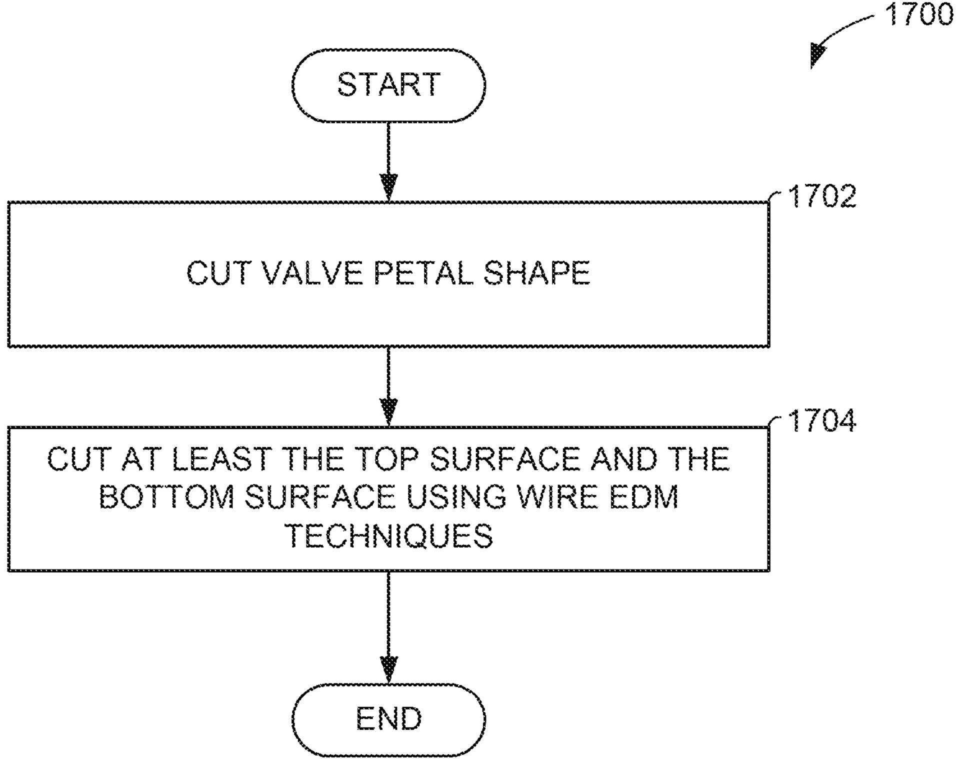
FIG. 17 illustrates a flowchart corresponding to a method for manufacturing an example obturator element, in accordance with the disclosed technology.

Now referring to FIG. 17, the disclosed technology includes a method 1700 for manufacturing and/or assembling a component for a valve assembly (e.g., dilating disk valve assembly 100, another dilating disk valve assembly, a ball valve assembly, a butterfly valve assembly, a gate valve assembly, a globe valve assembly, a piston valve assembly, a plug valve assembly, or any other type of valve or assembly thereof). The method 1700 can relate to creating an obturator element 200. As an example, the entirety of the obturator element 200 can be created from a single piece of material, such as a metal (e.g., steel, titanium, aluminum, or any other metal compound). In other words, the entirety of the obturator element 200 can be formed from a monolithic starting material. Monolithic starting material may mean a single block or piece of starting material, such as metal.

The method 1700 can include cutting 1702 or otherwise forming the component (e.g., obturator element 200) from a single piece of metal. Cutting 1702 the component (e.g., obturator element 200) can refer to manufacturing a rough or approximate (e.g., unfinished) shape ("a workpiece") of the finished component. For example, such manufacturing steps or techniques can include molding, casting, pressing, milling, machine cutting, computer numerical control (CNC) systems, drilling, and/or any other form of suitable forming technique.

The method 1700 can include cutting 1704 (or finishing) at least one surface of the workpiece (e.g., at least the top surface 201 and the bottom surface 205 of the obturator element 200) using EDM techniques (e.g., wire EDM techniques). For example, electricity can be flown through an electrode, such as a conductive wire, to cut or erodes pieces of material from the workpiece (e.g., the obturator element 200). The electrode and the workpiece can both be immersed in a dielectric fluid, which can be continuously circulated and filtered. Typically, the workpiece acts as an anode, and the electrode acts as a cathode. A thin gap can be maintained between the electrode and the workpiece, such as via a servo system. While wire-cut EDM techniques are primarily referenced herein, the disclosed technology can, alternatively or in addition, include other EDM techniques, such as die sinking EDM techniques, fast hole drilling EDM techniques, and/or micro EDM mill techniques. As will be appreciated, wire EDM techniques can achieve a near-zero surface roughness (or a surface roughness sufficiently low to form a tight seal between abutting surfaces). Further, EDM techniques (e.g., wire EDM techniques) can achieve high-quality finishes, reducing or eliminating the need for post-processing procedures and surface treatments, which are often necessary with other manufacturing processes. Alternatively, the method 1700 can include cutting or finishing at least the top surface 201 and the bottom surface 205 of the obturator element 200 using high-pressure water cutting techniques (e.g. via a water jet cutter), laser cutting techniques (e.g., via a laser cutter), and/or various polishing techniques (e.g., forming the obturator via milling and/or lathing and subsequently polishing one or more surfaces to meet the surface roughness requirements set forth herein). Furthermore, while the method 1700 is discussed herein as including a first cutting 1702 or forming step to produce a workpiece before cutting 1704 or finishing at least one surface of the workpiece, the method 1700 can alternatively omit cutting 1702 or otherwise forming the initial workpiece. That is to say, the method 1700 can include cutting 1704 the component directly from a raw material.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence (s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be affected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the example embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein.

CONCLUSION

The above-discussed examples were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. An obturator element comprising:
a top side having a substantially convex curvature;
a bottom side having a substantially concave curvature;
a first side comprising:
- a first outer side wall comprising a control aperture and a hinge aperture; and
- a first recessed portion comprising a first inner side wall that is recessed inwardly relative the first outer side wall; and a second side comprising:
- a second outer side wall comprising the hinge aperture; and
- a second recessed portion comprising a second inner side wall that is recessed inwardly relative the second outer side wall, wherein the top side and the bottom side have a surface roughness less than approximately 60 micro-inch roughness average (Ra).

2. The obturator element of claim 1, wherein the top side and the bottom side have a surface roughness between approximately 15 micro-inch Ra and approximately 60 micro-inch Ra.

3. The obturator element of claim 1, wherein the top side and the bottom side have a surface roughness less than approximately 30 micro-inch Ra.

4. The obturator element of claim 3, wherein the top side and the bottom side have a surface roughness between approximately 12 micro-inch Ra and approximately 30 micro-inch Ra.

5. The obturator element of claim 4, wherein the top side and the bottom side have a surface roughness between approximately 4 micro-inch Ra and approximately 12 micro-inch Ra.

6. The obturator element of claim 1, wherein the top side and the bottom side have a largest surface imperfection of less than approximately 8 microns, the largest surface imperfection corresponding to a maximum microscopic peak or valley.

7. The obturator element of claim 1, wherein the top side, bottom side, first side, and second side are all formed from a monolithic starting material.

8. The obturator element of claim 1, further comprising:

a hook bounded by the top side and the bottom side; and a curved space defined by the bottom side.

9. A dilating disk valve comprising:

a body comprising an aperture;

a gear mechanism comprising a rotating ring; and a plurality of obturator elements, each of the plurality of obturator elements comprising a unitary component comprising:

a top side having a substantially convex curvature and a top side sealing surface;

a bottom side having a substantially concave curvature and a bottom side sealing surface; and a lateral side comprising:

an outer side wall comprising a control aperture and a hinge aperture; and a recessed portion comprising an inner side wall that is recessed inwardly relative the outer side wall, wherein the top side sealing surface and the bottom side sealing surface of each of the plurality of obturator elements have a surface roughness between approximately 15 micro-inch roughness average (Ra) and approximately 60 micro-inch Ra.

10. A dilating disk valve comprising:

a body comprising an aperture;

a gear mechanism comprising a rotating ring; and a plurality of obturator elements, each of the plurality of obturator elements comprising a unitary component comprising:

a top side having a substantially convex curvature and a top side sealing surface;

a bottom side having a substantially concave curvature and a bottom side sealing surface; and a lateral side comprising:

an outer side wall comprising a control aperture and a hinge aperture; and a recessed portion comprising an inner side wall that is recessed inwardly relative the outer side wall, wherein the top side sealing surface and the bottom side sealing surface of each of the plurality of obturator elements have a surface roughness less than approximately 30 micro-inch Ra.

11. The dilating disk valve of claim 10, wherein the top side sealing surface and the bottom side sealing surface of each of the plurality of obturator elements have a surface roughness between approximately 12 micro-inch Ra and approximately 30 micro-inch Ra.

12. The dilating disk valve of claim 11, wherein the top side sealing surface and the bottom side sealing surface of each of the plurality of obturator elements have a surface roughness between approximately 4 micro-inch Ra and approximately 12 micro-inch Ra.

13. A dilating disk valve comprising:

a body comprising an aperture;

a gear mechanism comprising a rotating ring; and a plurality of obturator elements, each of the plurality of obturator elements comprising a unitary component comprising:

a top side having a substantially convex curvature and a top side sealing surface;

a bottom side having a substantially concave curvature and a bottom side sealing surface; and a lateral side comprising:

an outer side wall comprising a control aperture and a hinge aperture; and a recessed portion comprising an inner side wall that is recessed inwardly relative the outer side wall, wherein the top side sealing surface and the bottom side sealing surface of each of the plurality of obturator elements have a largest surface imperfection of less than approximately 8 microns, the largest surface imperfection corresponding to a maximum microscopic peak or valley.

14. A dilating disk valve comprising:

a body comprising an aperture;

a gear mechanism comprising a rotating ring;

a plurality of obturator elements, each of the plurality of obturator elements comprising a unitary component comprising:

a top side having a substantially convex curvature and a top side sealing surface;

a bottom side having a substantially concave curvature and a bottom side sealing surface; and a lateral side comprising:

an outer side wall comprising a control aperture and a hinge aperture; and a recessed portion comprising an inner side wall that is recessed inwardly relative the outer side wall; and a sealing ring that is approximately axially aligned with the aperture, wherein the recessed portion of each of the plurality of obturator elements is configured to abut the sealing ring when the dilating disk valve transitions from an open state to a closed state.

15. The dilating disk valve of claim 14, wherein the sealing ring comprises:

a ring body have an approximately C-shaped cross-sectional shape; and a sealing material configured to insert at least partially into the ring body.

16. The dilating disk valve of claim 15, wherein the ring body comprises:

an inner wall having an inner wall thickness; and an outer wall having an outer wall thickness, the outer wall thickness being less than the inner wall thickness.

17. The dilating disk valve of claim 16, wherein a ratio of the outer wall thickness to the inner wall thickness is approximately 0.5 or less.

18. The dilating disk valve of claim 17, wherein a ratio of the outer wall thickness to the inner wall thickness is approximately 0.35 or less.

19. The dilating disk valve of claim 18, wherein all of the plurality of obturator elements are formed from a monolithic starting material.

20. The dilating disk valve of claim 9, wherein each of the plurality of obturator elements further comprises:

a hook bounded by the top side and the bottom side; and a curved space defined by the bottom side, wherein the curved space of each obturator element is configured to receive the hook of an adjacent obturator element.

* * * * *